July 23, 1957 R. J. GARMY 2,800,519
METHOD AND APPARATUS FOR FORMING INGOTS
Filed Nov. 12, 1953 14 Sheets-Sheet 1
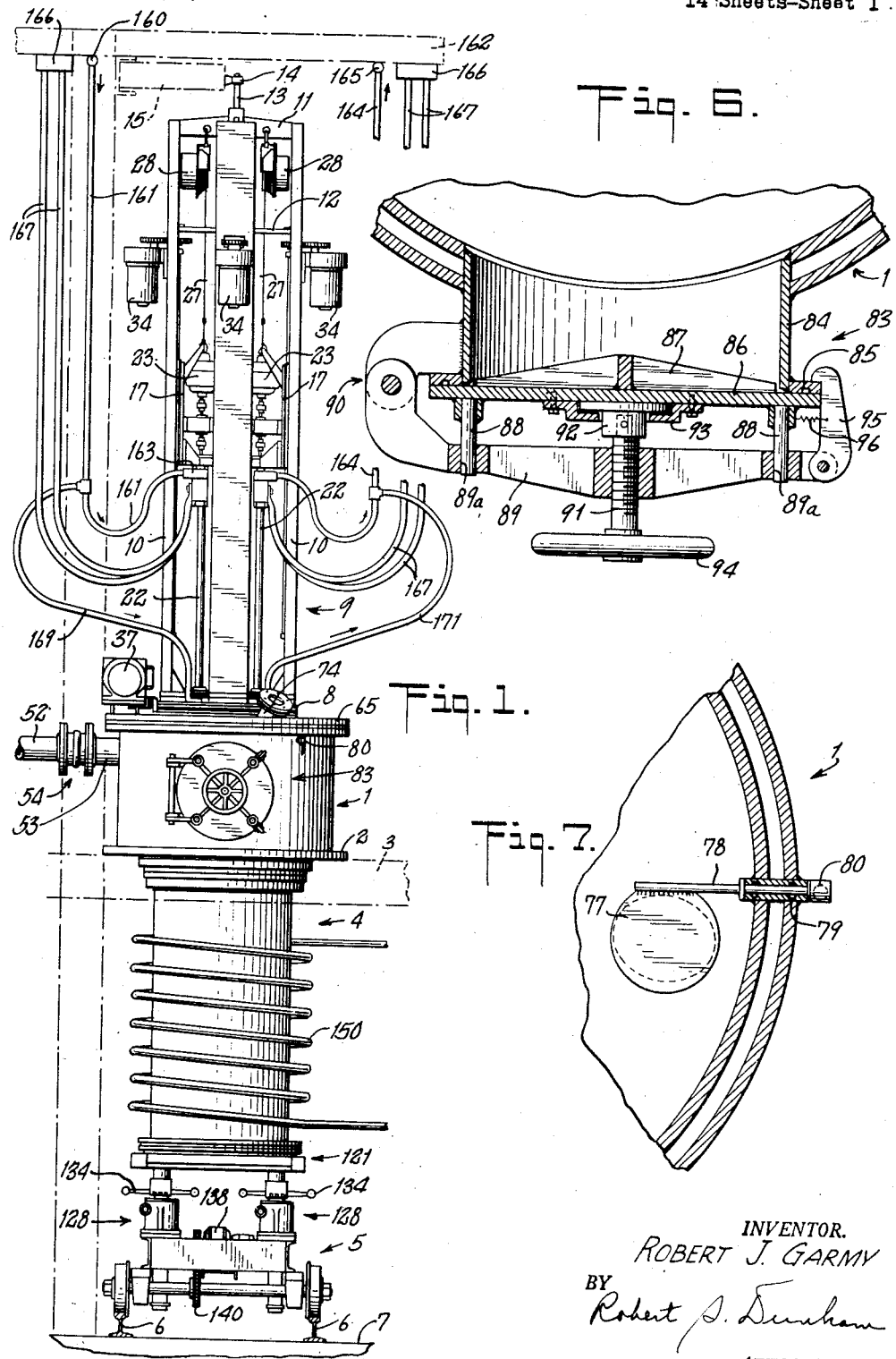
INVENTOR.
ROBERT J. GARMY
BY
Robert S. Dunham
ATTORNEY

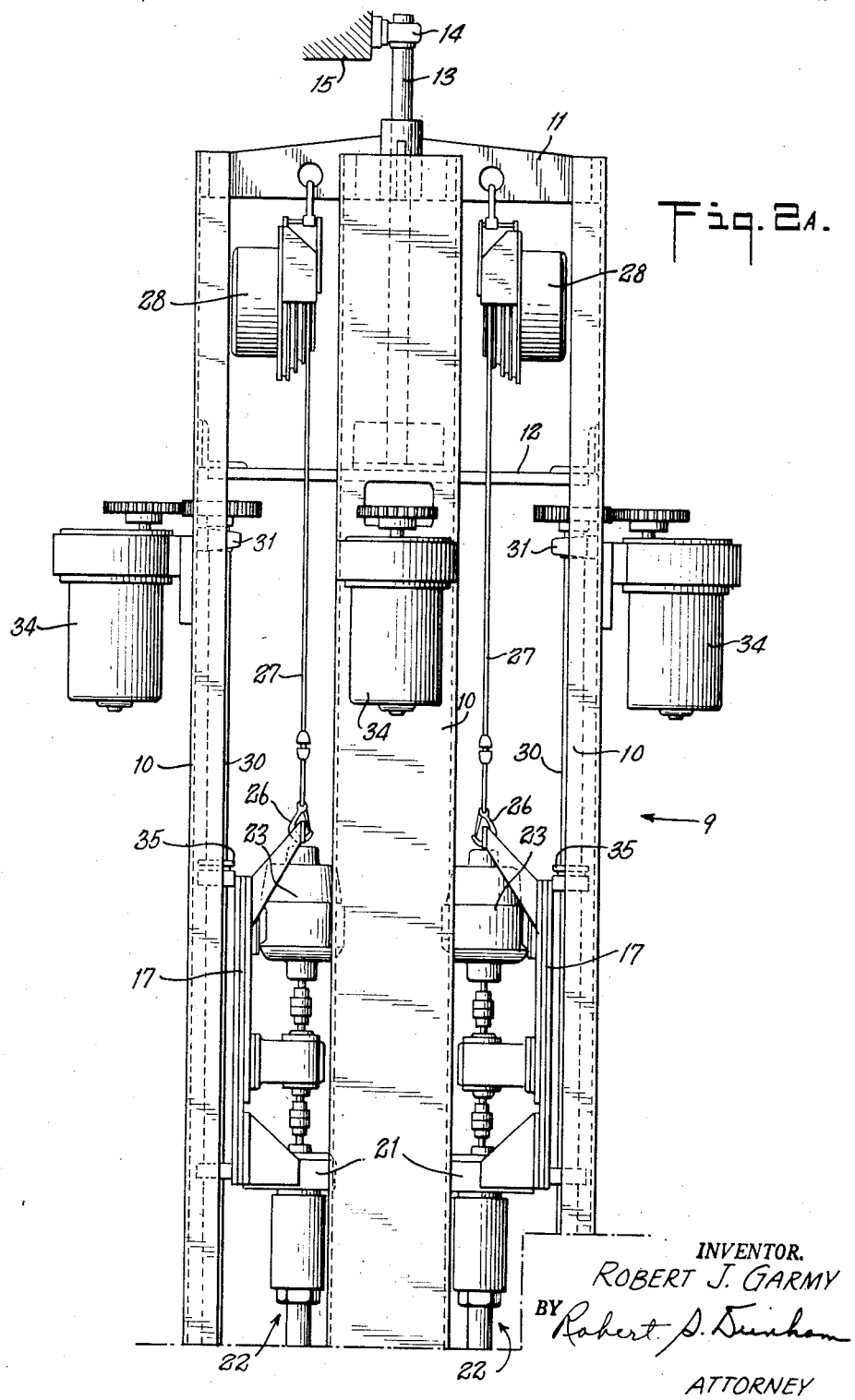

July 23, 1957     R. J. GARMY     2,800,519
METHOD AND APPARATUS FOR FORMING INGOTS
Filed Nov. 12, 1953     14 Sheets-Sheet 3
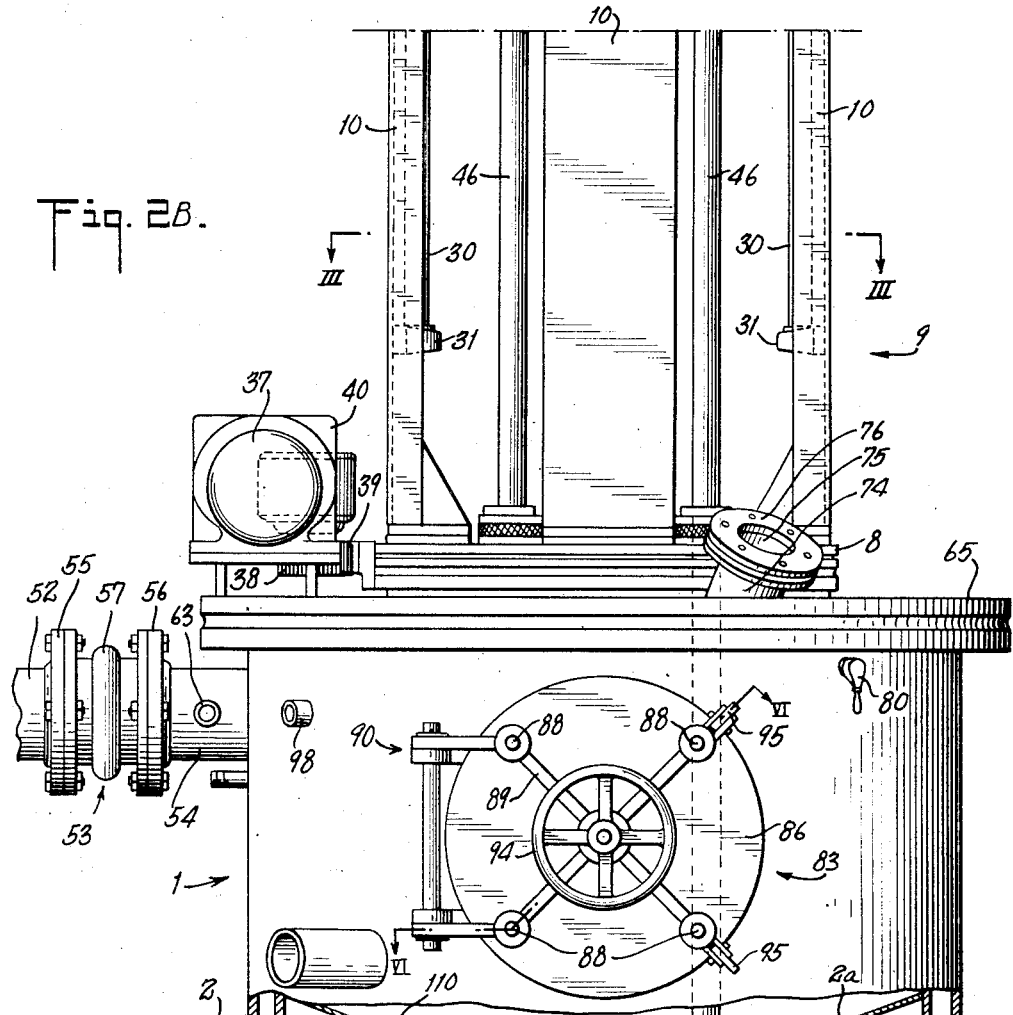
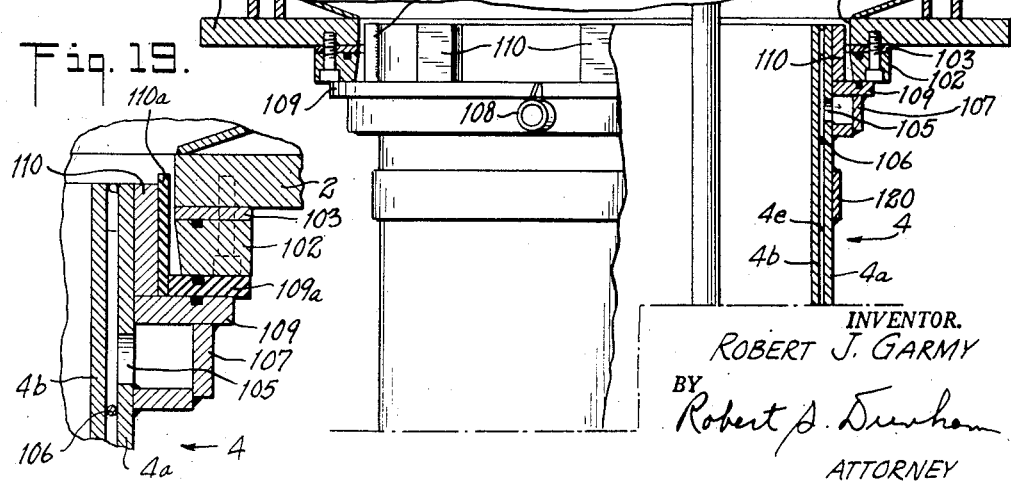
INVENTOR.
ROBERT J. GARMY
BY Robert A. Dunham
ATTORNEY

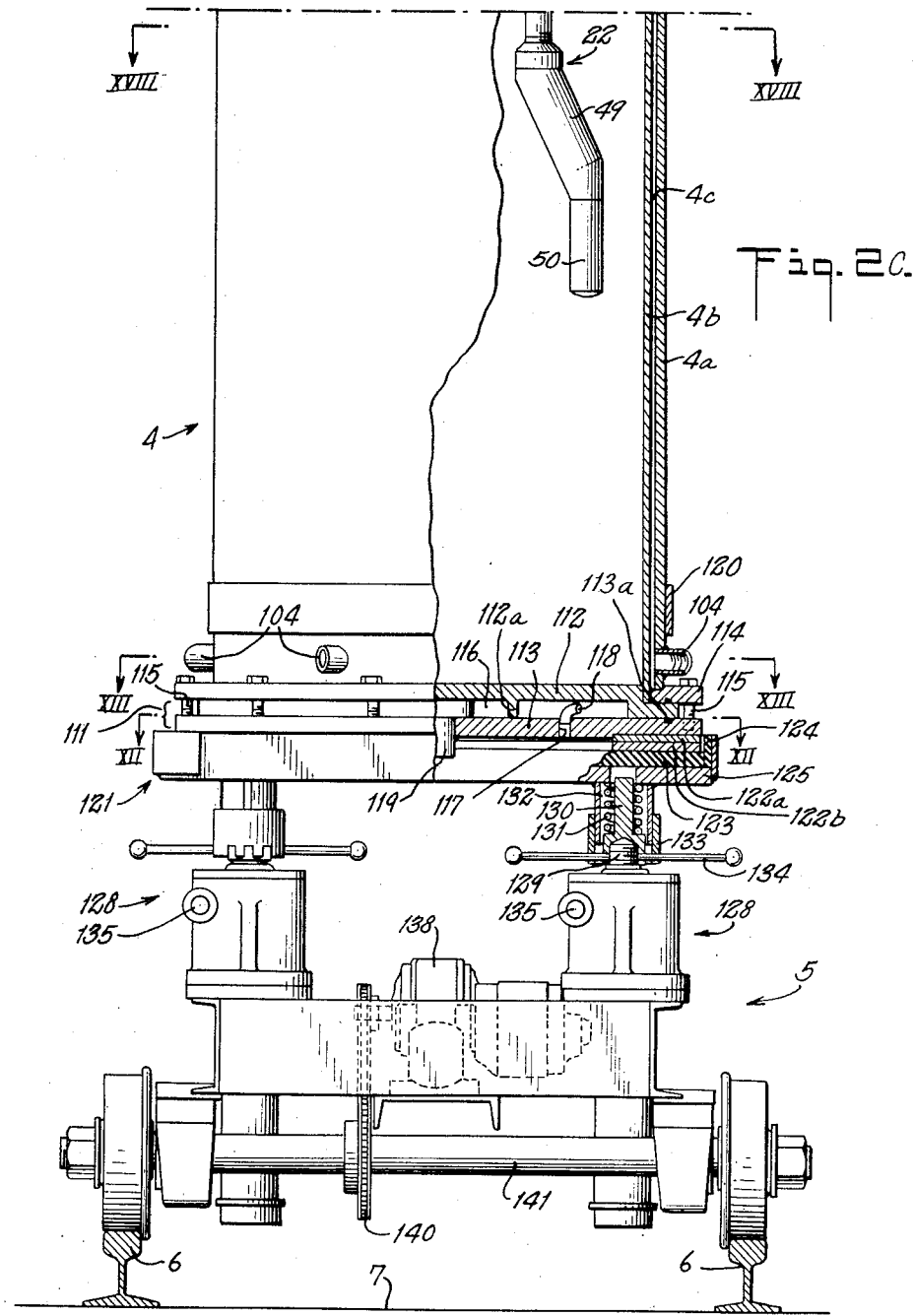

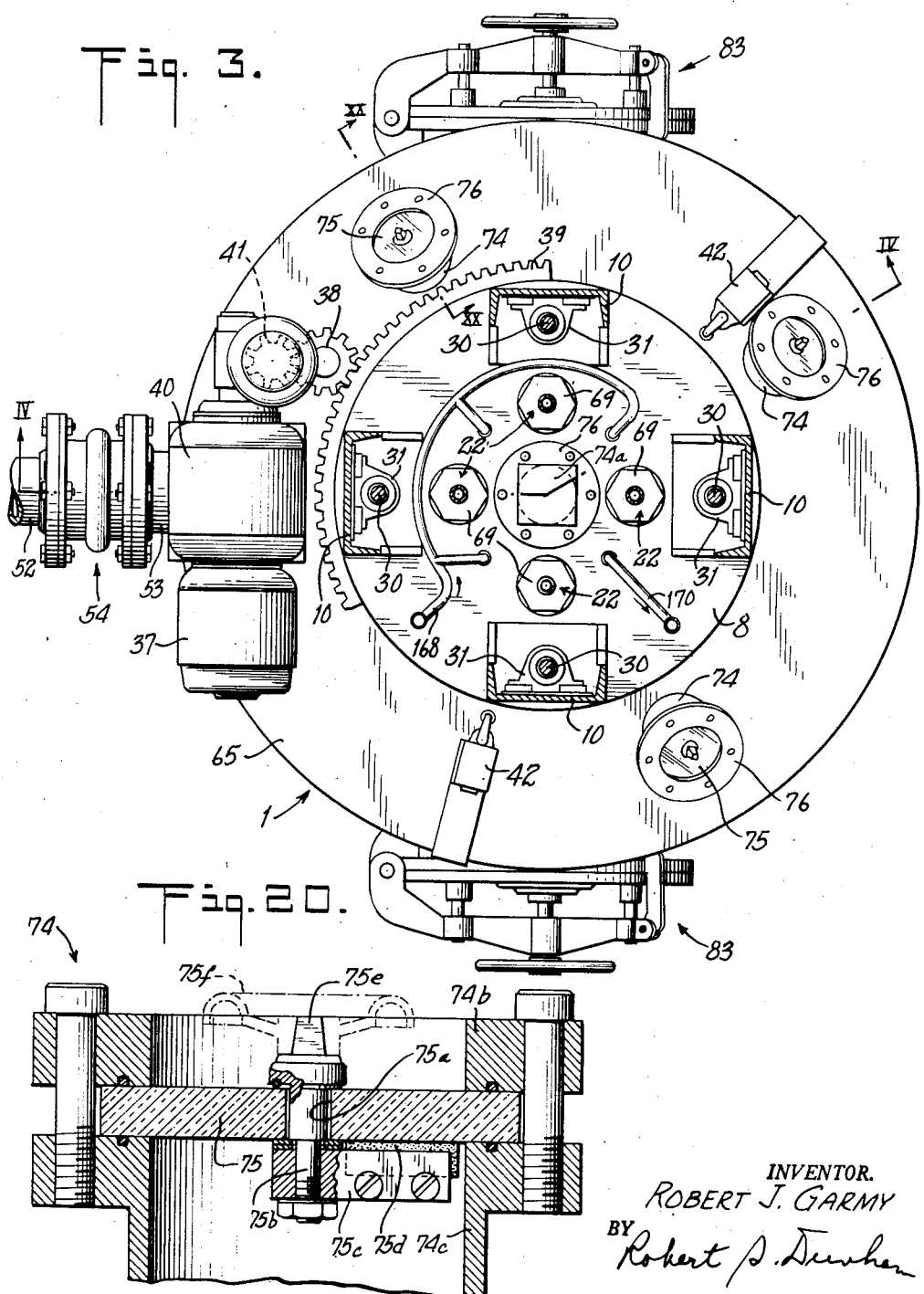

July 23, 1957
R. J. GARMY
2,800,519
METHOD AND APPARATUS FOR FORMING INGOTS
Filed Nov. 12, 1953
14 Sheets-Sheet 6
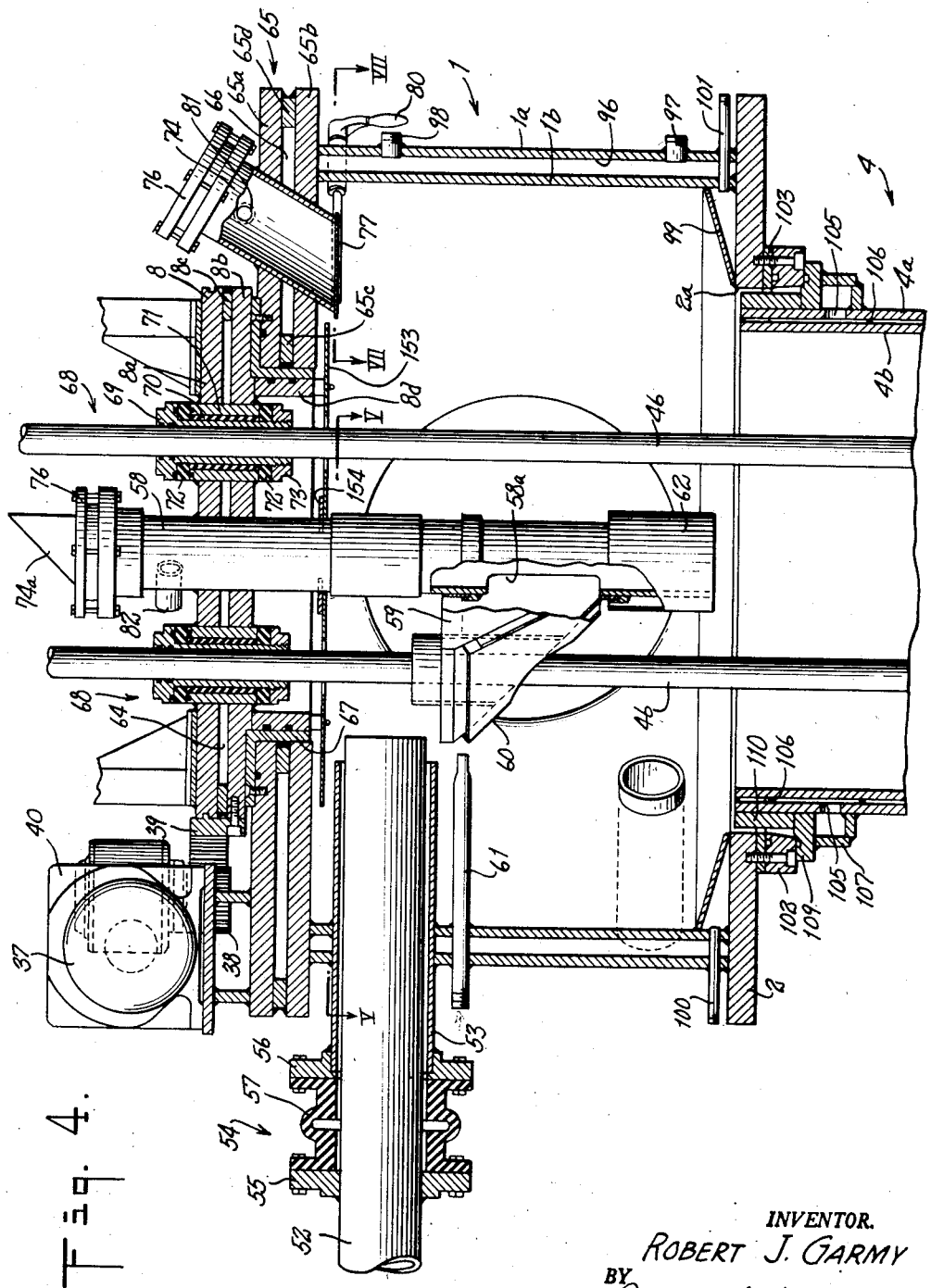
INVENTOR.
ROBERT J. GARMY
BY
Robert S. Dunham
ATTORNEY July 23, 1957  R. J. GARMY  2,800,519
METHOD AND APPARATUS FOR FORMING INGOTS
Filed Nov. 12, 1953  14 Sheets-Sheet 7

INVENTOR.
ROBERT J. GARMY
BY
ATTORNEY

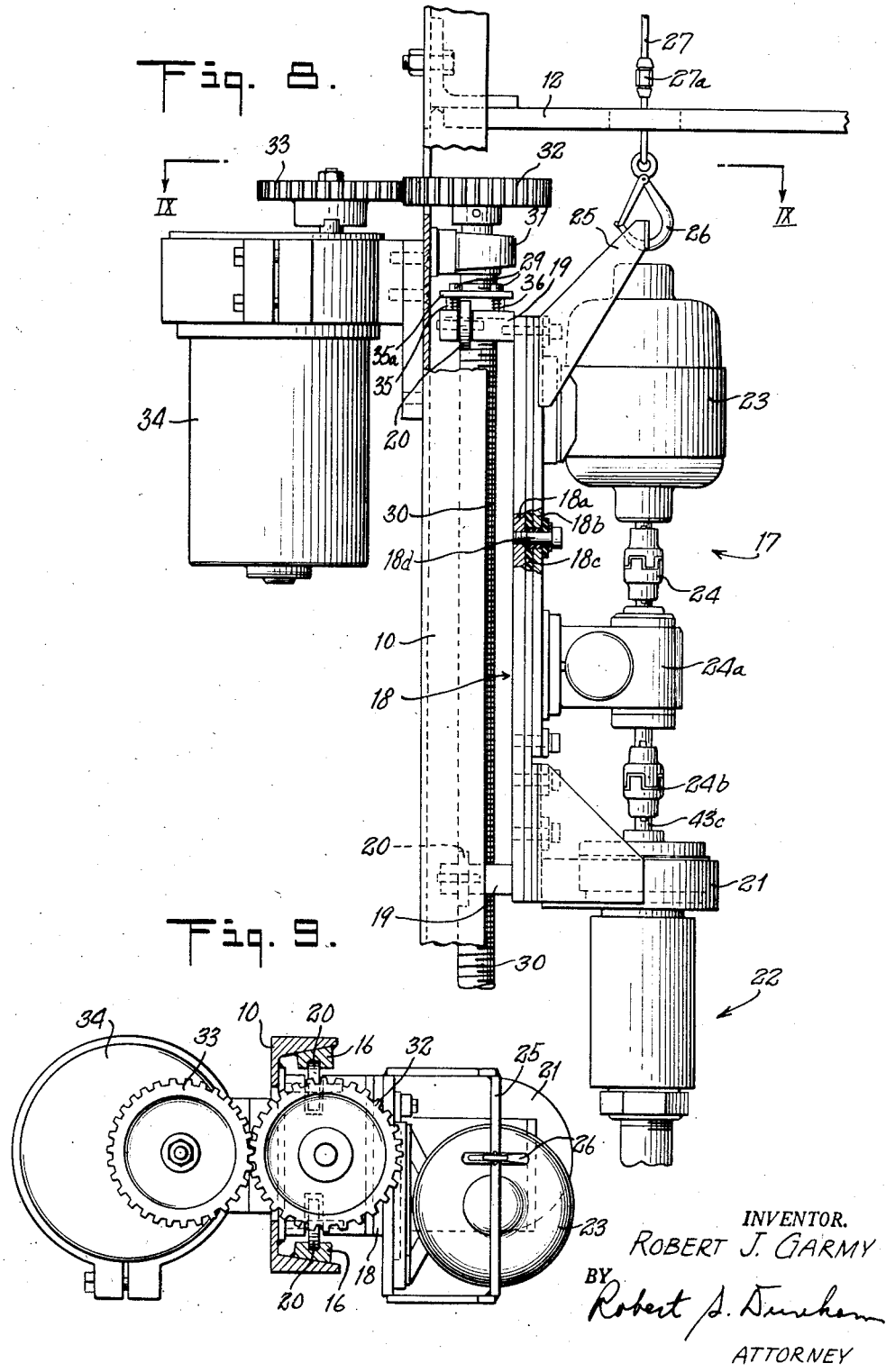

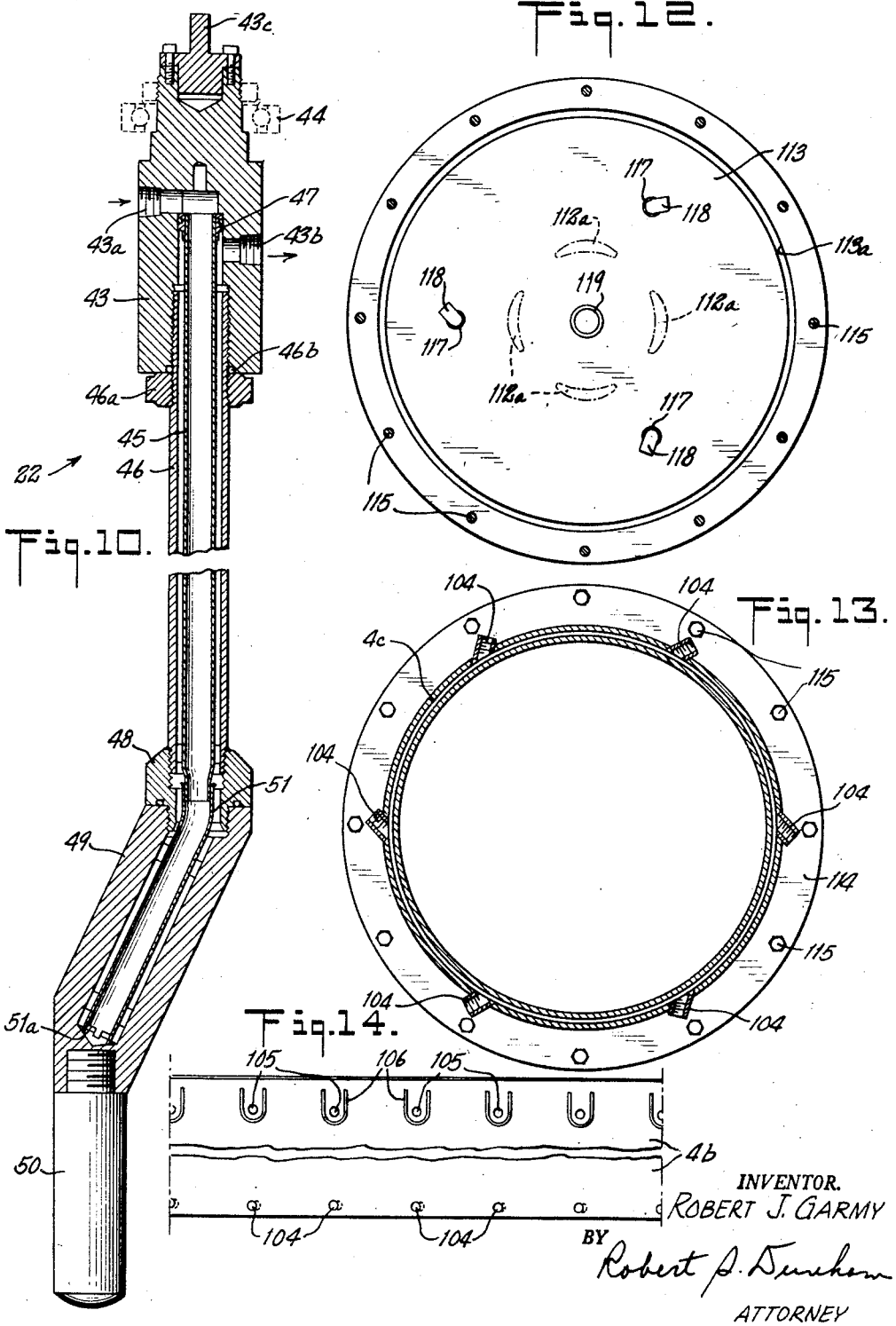

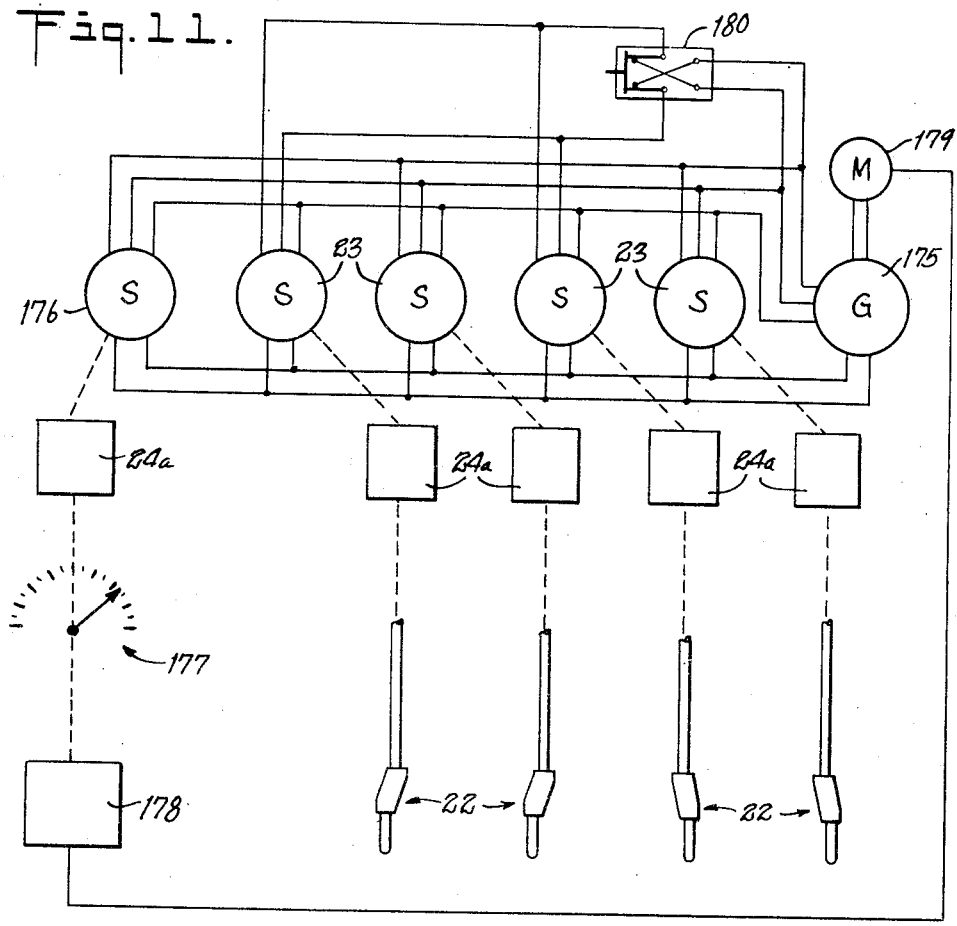
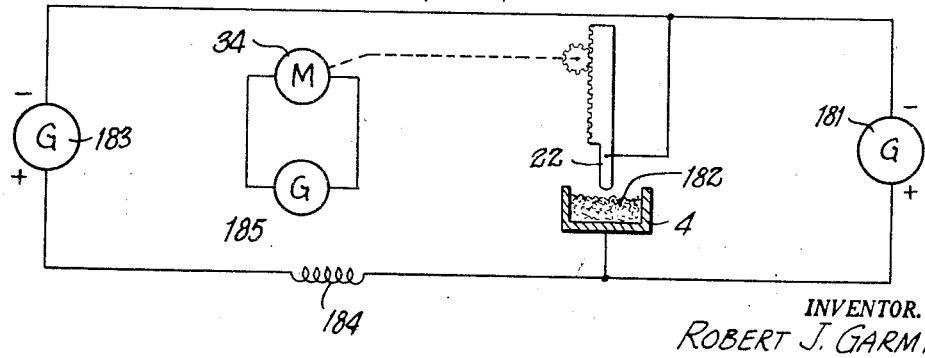

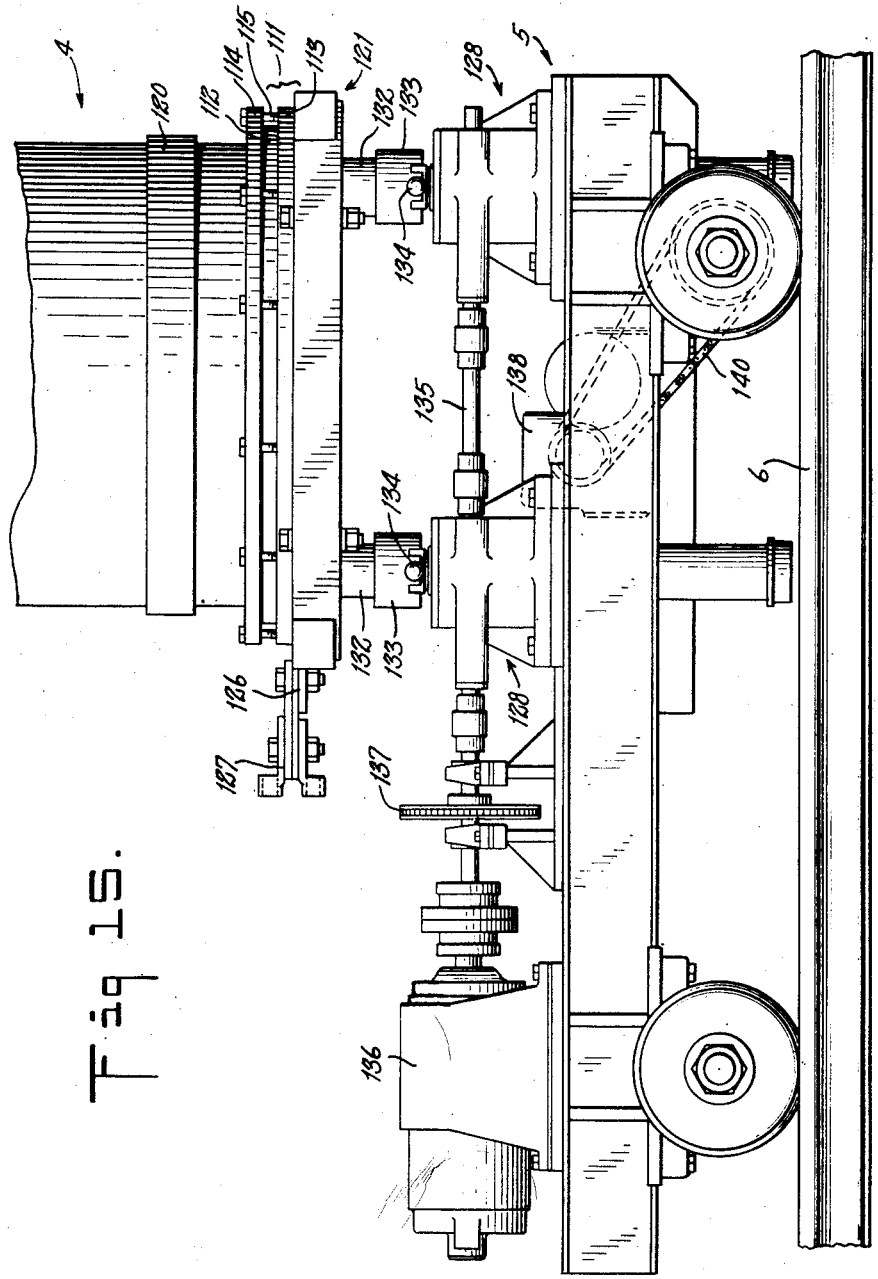

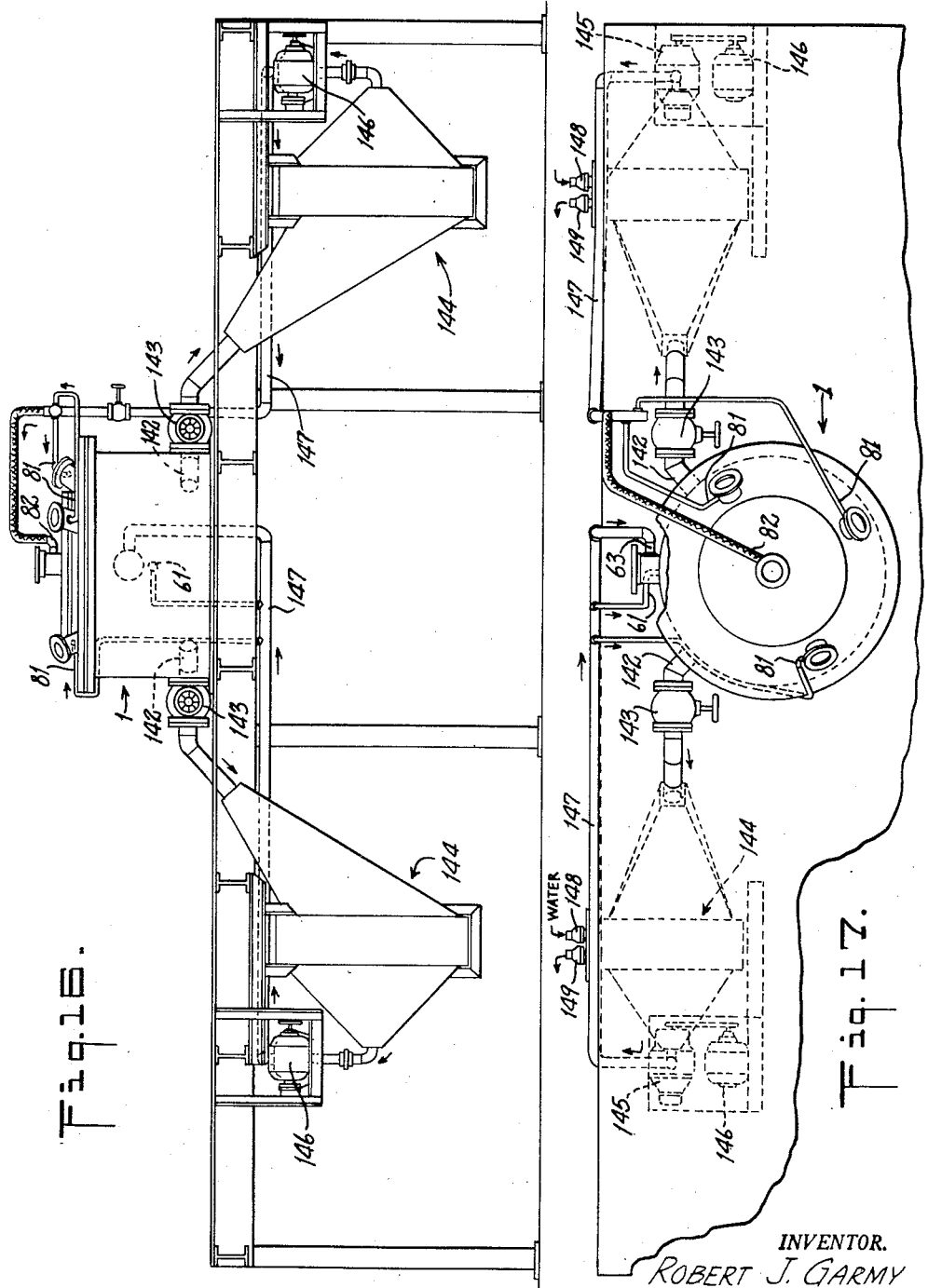

INVENTOR.
ROBERT J. GARMY

United States Patent Office 2,800,519
Patented July 23, 1957

2,800,519
METHOD AND APPARATUS FOR FORMING INGOTS

Robert James Garmy, Canton, Ohio, assignor to Republic Steel Corporation, Cleveland, Ohio, a corporation of New Jersey Application November 12, 1953, Serial No. 391,549

33 Claims. (Cl. 13—9)

The present invention relates to methods and apparatus for forming ingots, particularly from metal in relatively small fragments, such as scrap, crystals or particles in the so-called sponge form. It especially relates to formation of ingots of metals such as titanium and zirconium which are reduced from their ores to small metal particles. Typically, these metals are obtained as metal sponge by reduction of their respective chlorides, with magnesium as the reducing agent. The invention also relates to the formation of ingots from alloys of a metal of the type described with desirable additives such as vanadium, aluminium, chromium, iron, etc.

In order to provide metal in a form suitable for use in conventional fabrication processes, such as rolling, it is necessary to form it into ingots having homogeneous characteristics, i. e., without flaws, air spaces, or other occluded impurities. The formation of such ingots from metals such as titanium and zirconium presents very difficult problems. The metal must, of course, be melted in order to form the ingot. The melting points of such metals are very high, in the neighborhood of 3100°–3200° F. It is difficult even to raise a substantial volume of material to such a temperature. Furthermore, it is difficult to obtain such a temperature without running the risk of exceeding it, with consequent danger to personnel and risk of destruction of the apparatus used. At high temperatures, even considerably below their melting points, titanium and zirconium are very active chemically and will unite with almost any other element with which they come in contact. They are especially apt to be oxidized at such temperatures if there is any oxygen present. It has been proposed to construct of copper those parts of a melting furnace which contact the titanium. However, the melting point of copper (about 1800° F.) is substantially lower than that of titanium, and the temperature at which copper loses its working strength is even lower. It is therefore necessary to cool the copper parts of the furnace, usually with water jackets or the like. This cooling is necessarily, although not desirably, communicated to the titanium in the furnace, and results in a limitation of the volume of titanium metal which can be maintained molten at a given time. This presents a further difficulty in securing the formation of a homogeneous ingot when only a very small proportion of its volume is molten at any given time.

Metals such as titanium or zirconium combine rapidly at high temperatures with any chemically active gas present. For that reason, it has been the practice to melt such metals only in an atmosphere of completely inert gas.

Another source of trouble in the formation of such ingots is that the metal particles contain impurities which vaporize at the temperatures required. For example, titanium sponge contains small proportions of magnesium and magnesium chloride. These vaporized impurities interfere with normal furnace operation and tend to condense on and foul the cooler surfaces in the furnace structure where the melting operation is taking place.

An object of the present invention is to provide improved methods and apparatus for producing homogeneous ingots of metals such as titanium and zirconium.

Another object is to provide an improved electric furnace.

Another object is to provide improved apparatus for maintaining an inert gas atmosphere in an electric furnace during its operation.

Another object is to provide improved apparatus for electrically stirring molten metal in an electric furnace.

Another object is to provide arc stability, especially in a furnace employing a plurality of arcs.

Another object is to provide, in an electric furnace, improved apparatus for moving electrodes in the furnace during operation thereof.

Another object is to provide an improved crucible for an electric furnace.

A further object is to provide a crucible structure which may be separated into parts to facilitate removal of an ingot therefrom.

Another object of the invention is to provide an improved method of feeding metal in the form of small particles into an electric furnace.

Another object is to provide an improved method of moving a plurality of arcs in an electric furnace with a view to improving the distribution of their heating effects.

Another object of the invention is to provide an improved method of controlling the pressure of an inert gas in a furnace for melting a metal such as titanium or zirconium.

Another object is to provide an improved method of circulating an inert gas through a space in which a metal such as titanium or zirconium is being melted.

A further object is to provide an improved method for removing impurities from such a metal by condensing vapors from the circulating inert gas.

The foregoing and other objects of the invention are attained in the methods and apparatus described herein by providing an improved electric furnace including a crucible, means for feeding metal sponge into the center of the crucible, apparatus for circulating an inert gas through the crucible, electrodes for conducting a heating current through the metal sponge and thereby melting it, apparatus for moving the electrodes continuously so that their effect is felt in different parts of the crucible and so that all localities in the crucible are properly heated and electromagnetic means for stirring the molten metal and stabilizing the arcs at the electrodes.

The improved furnace comprises a stationary shell of generally cylindrical form having its lower end open. The crucible is adapted to be placed under the bottom of the shell and moved upwardly against it so that it is aligned with the opening. On the upper end of the shell is rotatably mounted a head structure which slidably and rotatably receives a number of electrode structures extending vertically through the shell with their tips in the crucible below. On its upper side, the head carries a vertically aligned cage structure supporting a number of vertically movable carriages, one for each electrode. Each carriage supports one electrode and a motor for oscillating that electrode on its own axis. There is associated with each carriage a motor for driving it vertically, which motor is controlled so as to maintain a constant arc length at the tip of the electrode. The head and all the structures mounted thereon are continuously oscillated angularly about the vertical axis of the furnace by a motor mounted on the upper end of the shell and drivingly connected to the head.

The particles are fed into the crucible through a feed pipe passing through one side of the shell. A hollow post projects downwardly from the center of the head and supports a hopper having an arcuate outer end which is under the inner end of the feed pipe. The lower end of the hopper communicates with the interior of the center post so that the incoming particles are dropped vertically into the center of the crucible through the hollow post. The particles tend to distribute over the central portion of the crucible. The electrodes are spaced radially from the center and are continually moved horizontally with respect to the surface of the metal in the crucible. The horizontal movement includes a repeated oscillation about the center of the crucible, and a movement toward and away from the center which may be controlled as to travel, or stopped and started as circumstances may require. The current flows through the arcs at the electrodes and thence through the molten bath to the crucible. There is provided on the outside of the crucible an electric coil which induces a vertical magnetic field in the crucible, reacting with the field of the current in the molten metal to produce a stirring of the molten metal.

The furnace is provided with many improved details including improved water jacket and water circulating arrangements on the crucible and the shell, improved bearing and heat shield structures for the oscillating head, improved sight tubes, and an improved quick-opening door mechanism on the shell. The crucible is constructed so that it may be quickly separated from the furnace at the end of a run and taken apart for the removal of the ingot.

Apparatus is provided for circulating an inert gas, for example helium or argon or mixture of both through the furnace while it is operating. The inert gas leaving the furnace passes through a condenser where it is cooled so that the vapors and impurities picked up in the furnace are deposited in the condenser. The cooled gas is then returned to the furnace where it is used to cool vital parts and displace contaminated gas.

Other objects and advantages of the invention will become apparent from a consideration of the appended specification and claims, taken together with the accompanying drawings.

In the drawings:

Fig. 1 is an overall elevational view of an electric furnace embodying the invention;

Figs. 2A, 2B and 2C together provide an elevational view of the complete furnace similar to Fig. 1, on an enlarged scale, and with some parts omitted or broken away and others shown in section;

Fig. 3 is a cross-sectional view taken on the line III—III of Fig. 2B and providing a plan view of the top of the shell and the oscillating head;

Fig. 4 is a central vertical sectional view taken on the line IV—IV of Fig. 3, with certain parts shown in elevation and partly broken away;

Fig. 6 is a fragmentary sectional view taken on the line VI—VI of Fig. 2B;

Fig. 7 is a fragmentary sectional view taken on the line VII—VII of Fig. 4;

Fig. 8 is a view partly in elevation and partly in section of one of the electrode supporting and moving mechanisms of Fig. 2A, on a still larger scale;

Fig. 9 is a sectional view taken on the line IX—IX of Fig. 8;

Fig. 10 is a vertical sectional view showing the details of construction of one of the electrodes;

Fig. 11 is a wiring diagram of the circuits for energizing the motors for moving the electrodes angularly;

Fig. 11A is a wiring diagram of a simplified circuit for one of the electrode raising and lowering motors;

Fig. 12 is a plan view of the crucible base structure, taken on the line XII—XII of Fig. 2C;

Fig. 13 is a horizontal sectional view of the crucible taken on the line XIII—XIII of Fig. 2C;

Fig. 14 is a developed inside elevational view of the crucible water jacket, showing the water inlet and outlet openings and the associated shield structures;

Fig. 15 is an elevational view of the crucible structure and its supporting truck, viewed from the left as it appears in Fig. 2C;

Fig. 16 is a somewhat diagrammatic elevational view of the furnace shell structure and the gas circulating apparatus associated with it;

Fig. 17 is a plan view of the apparatus shown in Fig. 16;

Fig. 19 is a fragmentary cross-sectional view similar to a portion of Fig. 2B, showing a modified structural arrangement;

Fig. 20 is a cross-sectional view taken on the line XX—XX of Fig. 3, illustrating the sight glass wiping mechanism.

GENERAL DESCRIPTION

Figure 5:
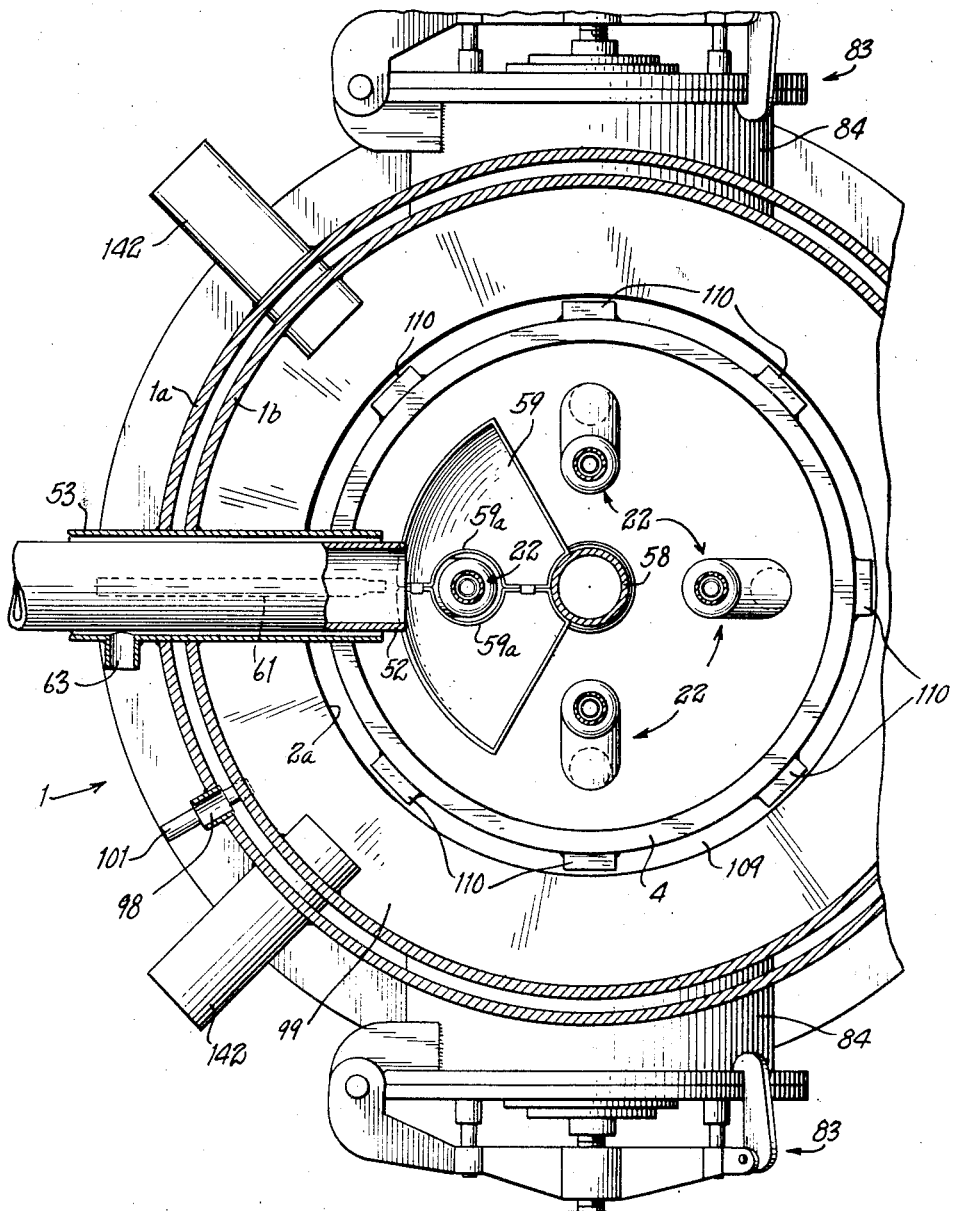
Fig. 5 is a horizontal sectional view taken on the line V—V of Fig. 4.

Fig. 1 shows, on a small scale, an electric furnace embodying the structural features of the invention. In this figure, some of the auxiliary apparatus associated with the furnace has been omitted in order to simplify the drawing.

Figs. 2A, 2B and 2C illustrate the same apparatus in Fig. 1 on an somewhat larger scale. Again, some of the auxiliary apparatus has been omitted in order to simplify the illustration.

The drawings illustrate an electric furnace including a generally cylindrical shell 1 having its axis vertical and provided with an annular base plate 2 resting on a floor 3. The shell base plate 2 has a central opening 2a (see Fig. 2B) in which is inserted the upper end of a crucible 4. The crucible 4 is mounted on a truck generally indicated at 5 which travels on rails 6 mounted on another floor 7 below the floor 3. The floor 3 has an opening (not shown) aligned with the opening 2a in the shell base plate, so that the upper end of the crucible may pass freely through it.

On the upper end of the shell 1 is rotatably mounted a head 8, which supports an elongated vertical frame, generally indicated at 9 and including four masts 10 whose upper ends are held in proper spacial relationship by two spreaders 11 and 12. An arbor 13 is fixed in the spreaders 11 and 12 and projects upwardly from the center of the framework 9. The upper end of arbor 13 is received in a radial bearing 14 mounted on a stationary support 15 which is fixed with respect to the floor 3.

Each of the masts 10 is of channel-shaped cross-section, and is provided on the inner faces of its flanges with a pair of rails 16 (see Fig. 9). A carriage 17 (Figs. 2A and 8) is vertically movable along each of the masts 10, being guided by the rails 16.

Electrode supporting and moving apparatus

The carriage structure is best seen in Fig. 8, and includes a composite rectangular body plate 18, including two steel plates 18a and 18b, separated by a layer of electrical insulating material 18c, and held together by bolts 18d, which are threaded in the plate 18a and insulated by suitable sleeves and washers, as shown, from the plate 18b. The body plate 18 has projecting legs 19 at each of its four corners, and rollers 20 journaled in the projecting legs. The rollers 20 ride in grooves formed in the rails 16. Mounted on but electrically insulated from the lower end of the body plate 18 is a horizontally extending bearing bracket 21, in which is journaled a vertically extending electrode structure generally indicated by the reference numeral 22, and shown in detail in Fig. 10.

The body plate 18 also supports an electric motor 23 whose shaft is connected through a suitable coupling 24, a reduction gear 24a, and an electrically insulating coupling 24b, to the upper end of the electrode 22. On the upper end of the body plate 18 is mounted a transverse bridge structure 25 connected by a hook 26 and a cable 27 having an electrically insulating insert 27a to a counterbalance mechanism 28 (Figs. 1 and 2A), which may be of any conventional type. The counterbalances 28 are supported on the upper spreader 11 of the frame 9.

The insulating structures described separate the electrode 22 from the frame 9, which is generally at the same potential as the crucible 4.

A number of bolts 29 (Fig. 8) are attached to the upper legs 19, on the carriage 17. A lead screw 30 is journaled in bearings 31 mounted at spaced points in the mast 10, and is driven through gears 32 and 33 by a motor 34 mounted on the back or outer side of the mast. A traveling nut 35 runs along the lead screw 30 and is provided with a flange 35a, through which the bolts 29 loosely extend, having their heads located on the opposite side of the flange 35a from the legs 19. Springs 36 encircle the bolts 29 and are held in compression between the flange 35a and the legs 19 to take up shock, which might result from a sudden contact of the electrode tip with a solid body, such as a mass of accumulated sponge in the crucible. The springs 36 are thereby effective to minimize damage to the electrode tips from such shocks, which damage might also add contamination to the bath in the crucible.

The cage on frame structure 9, as shown, includes four masts 10, each with its own carriage 17 and electrode 22. Each carriage 17 and electrode 22 has its vertical position determined by its associated motor 34. Each electrode 22 may be continuously oscillated by its associated motor 23.

The entire cage 9 is adapted for oscillation about the vertical axis of the shell 1 by means of a motor 37 (Figs. 1, 2B and 3) mounted on the upper end of the shell 1 and driving a pinion gear 38 journaled on the shell 1 and engaging a segment gear 39 fixed on the periphery of the head 8 (see Fig. 3). The driving connection between the motor 37 and pinion 38 includes a variable ratio drive mechanism 40 which may be of any conventional type, and an output gear 41 which engages the pinion 38.

The motor 37 is controlled by suitable circuits including a pair of limit switches 42 mounted on the shell 1 and engaged by the opposite ends of the segment gear 39. Each limit switch 42 is effective when actuated by an end of the gear 39 to control circuits which reverse the motor 37, so that the cage 9 is continuously oscillated between the two angular positions where the opposite ends of the segment gear 39 actuate the two limit switches 42. It should be noted that the spacing of switches 42 is such that the total angular movement of the cage 9 is substantially equal to the angular spacing between the masts 10.

While the furnace illustrated has four electrodes, it will readily be recognized that other numbers of electrodes may be used. Generally speaking, furnaces of smaller diameter may have smaller numbers of electrodes, while furnaces of greater diameter have greater numbers.

*Fig. 10.—Electrode structure*

This figure illustrates the details of the construction of one of the electrodes 22. This electrode includes a terminal head 43 adapted to be rotatably mounted in a bearing 44 which may be supported in the bearing bracket 21 (Fig. 8). The terminal head 43 is provided with a water inlet opening 43a and a water outlet opening 43b, and is adapted for attachment to a water cooled high capacity electric cable, which may be of a conventional type, such as that shown at 167 in Fig. 1. Any other equivalent means for conveying water to inlet 43a and from outlet 43b, and for conducting electricity to the head 43, may be employed. The lower end of the block 43 is recessed to receive two concentric tubes 45 and 46. The inner tube 45 is in communication with the water inlet 43a, while the space between the inner and outer tubes is in communication with the water outlet 43b. Fluid communication between the inlet and outlet is blocked by a suitable bushing 47. The outer tube 46 is provided with a thick wall and serves as the principal conductor of current to the electrode tip. It is sometimes hereinafter referred to as the electrode shaft. The lower end of the electrode shaft 46 is attached to a coupling 48 on which is mounted an angularly offset tip holder 49. The lower end of the tip holder 49 is recessed to threadedly receive an electrode tip 50 of suitable material, for example, graphite, tungsten, or the metal being melted.

The angular position of each electrode tip 50 must be fixed with respect to its own axis of oscillation, and the angular position of all the electrode tips 50 must be coordinated. This angular position, and the coordination of the several positions are necessary to the proper functioning of the system for oscillating the electrodes on their own axes, which system is described in detail below. For these reasons, the angular position of each electrode tip 50 is made adjustable with respect to a shaft 43c fixed on the terminal head 43. Shaft 43c is adapted to be connected in a fixed angular relationship with the coupling 24b (Fig. 8).

This angular adjustment is accomplished by providing a locking nut 46a on the electrode shaft 46, so that the shaft 46 can be set in any desired angular position with respect to the axis of terminal head 43, and then locked by nut 46a.

In order to provide a water seal between the electrode shaft 46 and the terminal head 43, a portion of the threads on shaft 46 are machined off near the end of head 43. A recess is provided in the head 43 to receive an O-ring 46b, which is squeezed to form a tight seal between the shaft 46 and the head 43 when the nut 46a is tightened.

The lower end of the inner tube 45 is received within the end of a tube 51 which extends through the hollow tip holder 49 and into the coupling 48. The lower end of tube 51 is provided with apertures 51a through which water may flow outwardly from the tube 51 into the space between that tube and the tip holder 49.

In the operation of the furnace, the electrode tips 50 are electrically negative with respect to the crucible 4 and the bath of molten metal. Electricity enters the electrode at the tip 50 and flows upwardly through the tip holder 49, coupling 48, and electrode shaft 46 to the terminal head 43. Cooling water enters the inlet 43a and flows downward through the inner tube 45, radially outward through apertures 51a and thence back up through the annular space between the inner tubes 51 and 45 on the one hand, and the tip holder 49 and electrode shaft 46 on the other hand, and thence out through the outlet 43b.

Cooling water is supplied to the several electrodes 22 from an inlet manifold 160 (Fig. 1) through flexible tubes 161. The manifold 160 is fastened to a stationary frame member 162. The flexible tubes 161 extend downwardly from the manifold 160 and are connected to suitable couplings 163 mounted on the terminal heads 43 of the various electrodes. Each coupling 163 also provides a connection for a flexible outlet tube 164 which extends upwardly to an outlet manifold 165, also attached to the frame member 162.

Electricity is supplied to the electrodes 22 from bus bars 166, mounted on the stationary frame member 162. Two flexible electric cables 167 are connected between each terminal head 43 and one of the bus bars 166. The cables 167 may be water cooled, one cable being used for water flowing in one direction and the other for water flowing in the return direction, with a cross connection (not shown) adjacent the terminal head 43. It has been found desirable to keep the cooling water system for the cables 167 separate from the cooling water system for the electrodes 22, in order to supply the electrodes 22 with water at a suitably low temperature.

The head 8 (Fig. 2B) is provided with a water jacket structure, described in detail below, supplied with cooling water through a manifold 168 (see Fig. 3), which receives water through a flexible tube 169 (Fig. 1), shown as being connected to one of the tubes 161 through a T-connection, and to the manifold through an elbow fixed on the head 8. An outlet 170 is provided for the water jacket on head 8. The outlet 170 likewise is connected through an elbow to a flexible tube 171 (Fig. 1) and thence through a T-connection to a water outlet tube 164 connected to one of the electrode water couplings 163. Instead of the T-connections shown for tubes 169 and 171, they may be connected directly to the respective manifolds 160 and 165.

All the flexible tubes and electric cables, including the tubes 161, 164, 169 and 171, and cables 167, are provided with downwardly depending loop portions which permit the movement of the frame 9 necessary to its oscillation on the shell 1, and also to permit the oscillation of the individual electrodes 22 on their own axes. It would be possible to construct the head 8 for rotation instead of oscillation, and also to construct the electrodes 22 for rotation instead of oscillation. However, such a construction would require the use of brushes rather than flexible cables for the electricity and the use of complex rotating seals for all the water connections. Since the furnace requires a large quantity of electricity and a large quantity of water, the present arrangement simplifies the electricity and water connections greatly, and therefore has substantial advantages over a rotating head or rotating electrode construction.

Circuits for electrode oscillating motors

Fig. 11 illustrates circuits for energizing the electrode oscillating motors 23 (Figs. 2A and 8). The arrangement shown is a system of the well known Selsyn type, including a generator 175 supplying electricity to the four motors 23 and an indicator driving motor 176, so that all the motors operate synchronously. Each motor 23 drives one of the electrodes 22 through a reducing gear 24a. The motor 176 drives, through a similar gear 24a, an indicator 177 and a reversing mechanism 178 operatively controlling a motor 179 which drives the generator 175. Motor 176 and indicator 177 are located so as to be accessible to the operator of the furnace. The reversing mechanism 178 is adjustable, for example, by means of movable limit switches, so that the operator can set the limits of angular travel of the indicator 177, and hence of the electrodes 22. Furthermore, the operator can stop the motor 179 and thereby establish the indicator 177 and all the electrodes 22 in any desired fixed position. It will be recognized that the indicator 177 travels angularly with the electrodes 22 and indicates their angular positions at all times.

Under some conditions of furnace operation, it is desirable to have all the electrodes moving angularly in phase. That is to say, all of the four electrodes will move inwardly together toward the center of the furnace and all will move outwardly together. Under other conditions, it may be desirable to shift some of the electrodes in phase relative to the others. For example, it may be desirable to have two of the electrodes moving inwardly while the other two are moving outwardly. There is illustrated in Fig. 11 a reversing switch 180 connected in two of the stator lines of two of the motors 23. When the reversing switch 180 is operated, it will reverse the rotation of these two motors 23 with respect to the other two motors 23. Consequently, by bringing the electrodes to the middle position in their range of travel and then reversing the switch 180, a phase displacement of the type described above may be accomplished.

Other phase displacements may be accomplished, for example, by shifting the respective electrodes angularly on their terminal heads 43 by means of the lock nuts 46a, described above.

Circuit for electrode raising and lowering motor

There is shown in Fig. 11A a typical circuit for controlling one of the motors 34. Circuits of this type are well known in the welding art. The circuit illustrated is shown in a somewhat diagrammatic manner by way of example only, and is not, per se, a part of the present invention.

There is shown in Fig. 11A a generator 181 for supplying electricity to an electrode 22 which cooperates with a mass of molten material 182 in a crucible 4. Also shown is a constant potential generator 183 which is connected in series with the field 184 of a generator 185 which supplies the motor 34 with electricity.

The constant potential generator 183 is connected across the electrode 22 and crucible 4 in parallel with the arc generator 181. As long as the potential drop across the arc at electrode 22 is equal to the potential generated by generator 183, then no current flows in the field winding 184 and the motor 34 remains stationary. If the potential drop across the arc at electrode 22 increases above the potential generated by generator 183, then current flows through the field winding 184 to the left as it appears in Fig. 11A and causes operation of motor 34 in a direction to lower the electrode 22 so as to decrease the length of the arc and thereby the potential drop across it. Similarly, a decrease in the desired potential drop across the arc results in operation of motor 34 in a direction to increase the length of the arc.

Each of the motors 34 has a separate control system, operated in response to the potential drop across the arc at the particular electrode 22 whose elevation the motor controls.

Sponge feeding apparatus (Figs. 4 and 5)

For purposes of illustration, the furnace described herein will be described as for the formation of a titanium ingot from titanium sponge which has been reduced from titanium tetrachloride by the use of magnesium as a reducing agent, and which contains minor proportions of magnesium and magnesium chloride as impurities. In using these specific materials and specific impurities as illustrations, it is not intended to imply that the invention is necessarily limited to such materials or to such impurities. The structure shown and described can treat, for example, zirconium just as well as it can treat titanium. It may also be used to handle other materials, including alloys of titanium or zirconium.

The titanium sponge is fed to the furnace in a continuous stream, preferably from a vibratory feeder (Fig. 21) of any suitable commercial type. The feeder discharges through a feed pipe 52 (see Fig. 4). The feed pipe 52 extends through a shield pipe 53 which is mounted in the side wall of the furnace shell 1. A flexible coupling, generally indicated at 54, connects the feed pipe 52 with the stationary shield pipe 53. This coupling includes a flange 55 attached to the feed pipe 52, a flange 56 attached to the shield pipe 53, and a flexible coupling sleeve 57, having flanges at its opposite ends which are respectively bolted to the flanges 55 and 56.

Extending through and fixed in the center of the oscillating head 8 is a hollow post 58 whose open lower end projects downward inside the shell 1 and is provided at one side near its lower end with an opening 58a. Supported on the outside of the post 58 is a hopper 59 (see Figs. 4 and 5). The hopper 59 is generally sector shaped in its horizontal cross-section, as may be seen in Fig. 5. Its upper end extends radially out from the hollow post 58 far enough so that its periphery is below the inner end of the feed pipe 52. The lower end of the hopper 59 communicates with the opening 58a in the post 58. The titanium sponge entering through the feed pipe 52 falls from its inner end into the hopper 59 and thence passes through the opening 58a into the post 58, so that it drops vertically down into the center of the crucible 4 below.

As shown in Fig. 5, one of the electrodes 22 extends vertically downward through the hopper 59. In order to permit this, the hopper 59 is made in right and left-hand sections, each with a recessed face 59a which together define a sleeve to permit free passage of the electrode 22.

Mounted on the outside of the hopper 59 is a heat shield 60 (Fig. 4), generally conforming to the shape of the hopper and spaced from it by a short distance. A nozzle 61 projects through the side of the shell 1 and terminates at a point directly opposite the opening between the hopper 59 and the upper end of the heat shield 60. As described more fully below, the nozzle 61 receives a continuous supply of cooled inert gas, for example, helium, which is directed into the space between the heat shield and the hopper and passes downwardly through that space and out the lower end thereof. A collar 62 is mounted on the lower end of the hollow post 58 and is concentric with the post and spaced outwardly from it. The upper end of the space between post 58 and collar 62 is directly opposite the lower end of the space between heat shield 60 and hopper 59 so that the flow of cool gas passing through that space tends to continue through the space around the lower end of the post 58. The shield pipe 53 is provided at 63 (see Fig. 5) with an inlet for cooled gas which flows through the space between feed pipe 52 and the shield pipe and out into the shell 1.

It may therefore be seen that all the parts through which the titanium sponge passes on its way to the center of the crucible are cooled by gas jackets and shields. These parts include the feed pipe 52 cooled by the gas flowing through shield pipe 53, the hopper 59 cooled by gas flowing through the shield 60 and the lower end of the post 58 cooled by gas flowing through the shield 62. The shields are also effective in reducing radiated heat. This cooling action prevents the metal particles from becoming tacky and clogging the feed mechanism.

By feeding the material through the side of the shell 1, interference with the oscillating frame 9 and all the other complex mechanism on and above the head is avoided.

*Material supply apparatus (Fig. 21)*

Figure 21:
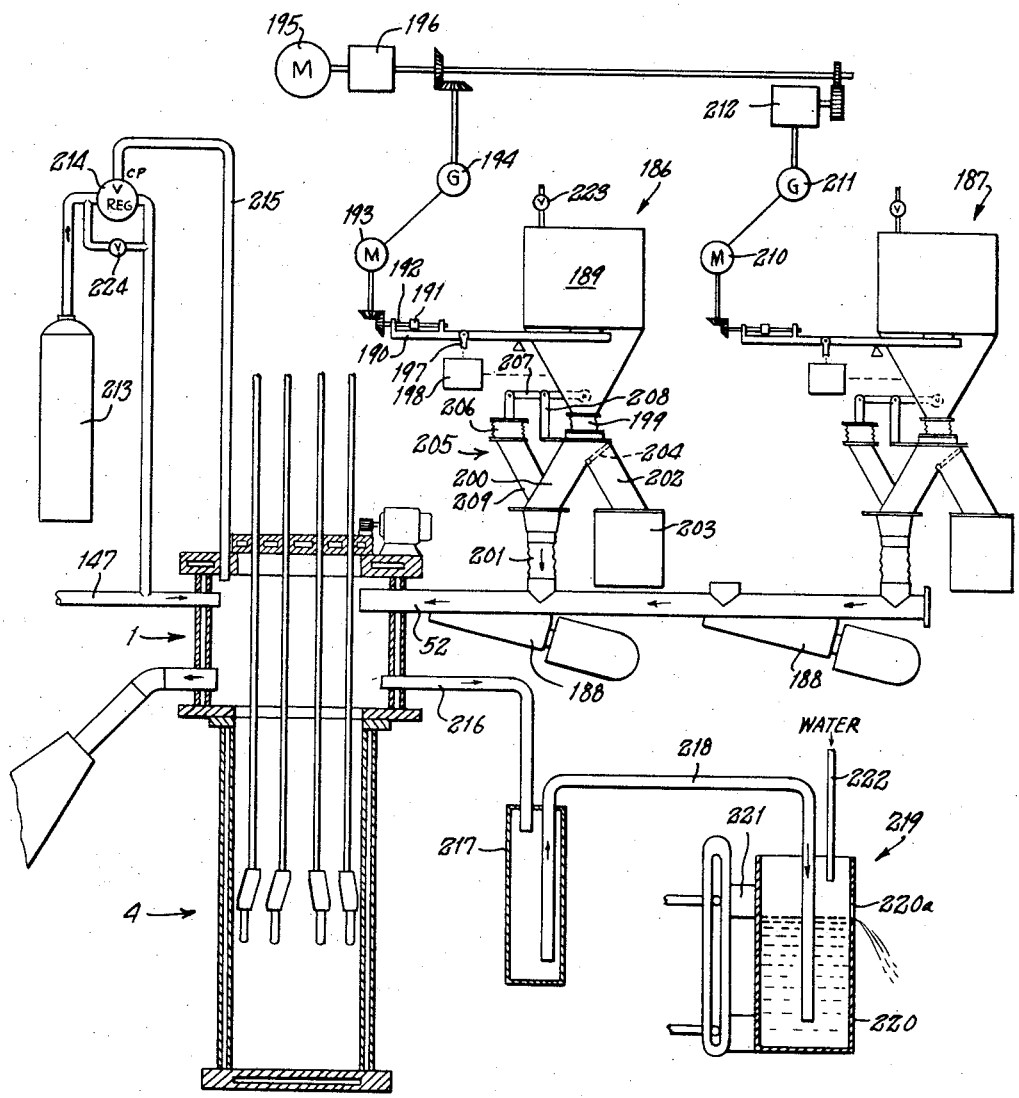
Fig. 21 is a somewhat diagrammatic view illustrating the apparatus for feeding metal particles to the furnace and the apparatus for regulating the pressure within the furnace.

The apparatus for supplying the metal particles to the feed pipe 52 is illustrated somewhat diagrammatically in Fig. 21. As there shown, the feed pipe 52 is supplied from two gravimetric feeders, generally indicated at 186 and 187. Two electrical vibratory feeders 188, of any suitable commercial design, are attached to the feed pipe 52 to ensure a continuous flow of material through it.

Although only two gravimetric feeders 186 and 187 are shown, it will be apparent that any number of such feeders could be used depending upon the number of components to be fed simultaneously to the furnace. The two feeders 186 and 187 are generally similar, except for a difference in size, and only the feeder 186 will be described. Feeders of the type shown are commercially available except for an accessory pressure-balancing mechanism which is considered to be a feature of the present invention and is described below.

The feeder 186 comprises a hopper 189 for receiving the material to be fed. The hopper 189 is supported on one end of a balance beam 190 provided with a counterweight 191 movable along the beam by a lead screw 192 which is rotated by means of a motor 193. The balance beam 190 and associated parts are shown only diagrammatically in the drawing, since they represent well known commercial arrangements. Motor 193 is a Selsyn motor energized by a generator 194 which is driven by a motor 195 through a variable ratio gear 196. The motor 193 drives the counterweight 191 along the balance beam 190 at a controlled rate which tends continuously to unbalance the beam 190. The beam 190 is connected through suitable linkage 197 to a feeder control 198 which operates suitable mechanism at the bottom of the hopper 189 to feed the material out of the hopper at a rate which maintains the balance of the beam 190. The arrangement shown is sometimes known as a gravimetric feeder of the loss-in-weight type. The material falls from the hopper 189 through a flexible coupling 199 into a pipe 200 which leads through another flexible coupling 201 into the feed pipe 52. Alternatively, the material falling from the hopper 189 may be directed through a pipe 202 into a catch box 203. The selective disposition of the material into pipes 200 and 202 is controlled by a damper 204. The catch box 203 is used, for example, when the apparatus is being started up, in order to establish a steady state of operation before the material is deposited in the feed pipe 52.

There is provided, as an accessory to the feeder 186, a pressure balancing mechanism generally indicated at 205. The pressure in the furnace shell 1 is communicated through the feed pipe 52 to the interior of the hopper 189. It acts upwardly on a substantially effective area within the hopper. While apparatus is provided, as described below, for maintaining the pressure constant in the shell 1, the pressure is subject to minor, rather rapid fluctuations. The exact cause of these fluctuations is not known, but it is considered to be due to the sudden vaporization of vaporizable impurities in the material being fed to the furnace. These sudden fluctuations of pressure, if uncompensated, would disturb the balance of the beam 190 and produce inaccuracies in its control of the rate of feed. In order to compensate for these pressure fluctuations there is provided a movable diaphragm 206, subject to the pressure in the furnace and having an effective area substantially equal to the effective area in the hopper 189 which is subject to the same pressure. The diaphragm 206 and the hopper 189 are attached to the opposite ends of a balance lever 207 which is mounted at its center on a fixed support 208.

It may be seen that any increase in pressure in the furnace acts upwardly on the hopper 189 directly and at the same time acts downwardly on hopper 189 through the diaphragm 206 and level 207. Consequently, the effect of the pressure fluctuations on the hopper is balanced. The diaphragm 206 is connected to the furnace pressure system through a pipe 209 substantially equal in length to the pipe 200 and joining that pipe at its lower end so that the pressure fluctuations are transmitted to the hopper 189 and to the diaphragm 206 with substantially equal velocity.

The feeder 187, as mentioned above, operates in the same manner as feeder 186 and is similar in structure except that it is smaller in size. The feeder 187 is driven by a motor 210, energized by generator 211, driven by the same motor 195 which drives generator 194. Another variable ratio gear mechanism 212 is connected between motor 195 and generator 211.

It may be seen from the foregoing that the two feeders 186 and 187 are driven at proportional rates of speed, depending upon the settings of the variable gear mechanisms 196 and 212. These two feeders are intended to be used when the apparatus is forming an ingot from an alloy. The principal constituent of the alloy is fed through the feeder 186 and the additive constituent through feeder 187. By feeding both constituents continuously and proportionally throughout the process of forming the ingot, it is ensured that the proportional relationship of the constituents is maintained throughout the ingot. This method of feeding the constituents simultaneously and continuously presents a substantial advantage over other methods of feeding, since it prevents any stratification of the constituents on the ingot. While only two feeders 186 and 187 are shown, it will be recognized that for alloys employing more than two constituents, additional feeders may be provided.

The feeding of the individual constituents through individual feeders also presents a substantial advantage in that it guards against the possibility of selective feeding of one constituent where the two constituents are mixed in the hopper of a single feeder. Where the different constituents are different particle sizes, then if both are mixed in a single feeder, the constituent having the finer particles will tend to flow out more readily and be fed in a higher proportion at the start of the run than at the end. The use of the separate feeders for the separate constituents avoids this difficulty.

Pressure regulating apparatus (Fig. 21)

Fig. 21 also illustrates suitable apparatus for regulating the pressure in the furnace shell 1. As there shown, the pressure regulating apparatus includes a reservoir 213, which may represent a commercial cylinder of argon or helium gas, or a plurality of cylinders providing a mixture of the two gases. The gas from the reservoir 213 flows through a constant pressure regulating valve 214 to one of the inlet pipes 147 described below in connection with Figs. 16 and 17. The pressure regulating valve 214 is controlled by the pressure in a static pressure line 215 connected to the interior of the furnace shell 1. The arrangement is such that gas is admitted from the reservoir 213 to the furnace shell 1 whenever the pressure in that shell drops below a predetermined value.

Excessive pressures in shell 1 are prevented by a controlled venting arrangement, including a vent pipe 216 leading from the interior of the shell 1 to a trap 217. From the trap 217 a pipe 218 leads to a water bubbler pressure control mechanism 219. The control mechanism 219 includes a container 220 mounted on a bracket 221 whose vertical position relative to the lower end of the pipe 218 may be adjusted by means of a suitable screw and slot arrangement. The container 220 is provided with an overflow port 220a which determines the level of the water in the container. Water is continuously trickled into the container through a pipe 222. The mechanism 219 maintains a fixed back pressure on the pipe 218. The water supply pipe 222 maintains the level in the container 220 even though some of the water therein may be sucked back through the pipe 218 upon a sudden drop in pressure in the shell 1. The trap 217 prevents any water which is sucked back in that manner from reaching the shell 1.

A pressure in the range between three and five ounces per square inch above atmospheric pressure is employed. A pressure in this range is a safety precaution which eliminates all possibility of leakage of air into the furnace. Furthermore, the upper limit of this range is quite critical with regard to the quality of product. If a higher pressure is used, it has been found that gas occlusions occur in the ingot, which result in metallurgical defects in the finished product, namely, scabs, slivers and laminations.

The equipment is adaptable with slight modifications, namely the addition of a vacuum pump and elimination of the bubbler venting arrangement, to operation at pressures less than atmospheric, for purposes of reducing ingot hydrogen, for example.

Head and bearing structure (Figs. 3 and 4)

The head 8, as best seen in Fig. 4, comprises an upper plate 8a and a lower plate 8b separated by a peripheral ring 8c. The plates 8a and 8b define between them a water jacket space 64, provided with suitable inlet and outlet connections including manifold 168 and outlet 170 (Fig. 3). The head 8 also includes a downwardly projecting flange 8d, encircling the lower side of the central portion of the head through which electrodes 22 and the hollow post 58 extend.

The shell 1 has an upper end plate generally indicated at 65, and including an upper plate 65a and a lower plate 65b separated by inner and outer rings 65c and 65d. The plates 65a and 65b define a water jacket space 66, provided with suitable inlet and outlet connections, not shown. There is fixed on the central portion of the upper end plate 65 a bearing member 67 including a cylindrical collar which extends vertically between the flange 8d and the radially inner surface of the end plate 65, and a horizontally extending flange, which lies between the peripheral portion of the under surface of the head 8 and the end plate 65. The collar portion of bearing 67 serves as a radial bearing for the head 8, while the flange on the bearing member 67 serves as a thrust bearing.

Four bushing assemblies, each generally indicated by the reference numeral 68, are fixed in the head 8 and each encircles and electrode shaft 46. Each bushing assembly 68 includes an inner bushing 69 of friction reducing material, a concentric outer electrical insulating sleeve 70, both inserted in a metal insert 71 which is welded to the upper and lower plates of the head 8. Electrically insulating washers 72 are provided at the ends of the sleeve 70. The washers 72 and sleeve 70 cooperate to insulate bushing 69 from the insert 71. A nut 73 threadedly engages the inner bushing 69 to hold the assembly tightly together. The upper end of the inner bushing 69 is flanged to engage the upper washer 72, and is provided with a hexagonal head, best seen in Fig. 3, for convenience in tightening the assembly.

A horizontally extending heat shield plate 153 is fixed on the lower end of the flange 8d and spaced downwardly a short distance therefrom. The plate 153 is apertured to permit passage of the electrode shafts 46. The plate 153 is annular in form, being assembled from four quadrants. At its center, each quadrant has welded to it a supporting pin 154 which is received in a recess in the center post 58. The plate 153 protects the head 8 and its various associated bearing structures, at least to a certain extent, from radiant energy coming from the crucible 4.

The various parts which make up the head 8 are preferably welded together, and the parts which make up the shell 1 are also preferably welded together, as shown in the drawings.

Sight tubes (Figs. 3, 4, 7 and 20)

Three sight tubes 74 are mounted in and extend through the upper end plate 65 of the shell 1. Each sight tube 74 is provided at its outer end with a suitable window 75 and a frame 76. The inner end of each sight tube is provided with a cover plate 77, best seen in Fig. 7. Each cover plate is attached at one edge to a shaft 78 which extends out of the shell 1 through a bushing 79 and is provided on its outer end with a handle 80 by which the cover plate 77 may be rotated between a position shown in Fig. 4 in which it closes the end of its associated sight tube and a position substantially at right angles to the position just described, in which the sight tube is open. The shaft 78 is frictionally loaded to maintain any angular position in which it is set. Each sight tube is provided with a gas inlet 81 (Fig. 4) through which cooled inert gas is supplied. This gas circulates through the sight tubes and scavenges them of any gas from the furnace which might contain vaporized impurities having a tendency to deposit on and obscure the window 75.

Sight glass wiper mechanism (Fig. 20)

This mechanism is illustrated in detail in Fig. 20. As there shown, each sight tube 74 has mounted on its outer side a window 75, which is clamped between two frame members 74b and 74c. The window 75 is provided with a central aperture 75a in which is journaled a shaft 75b carrying on its inner side a wiper arm 75c supporting a wiper 75d which may be, for example, asbestos. The shaft 75b is provided on its outer end with a square shank 75e for engagement by a cooperating square recess in a handle 75f. If it is found that the window 75 is obscured by reason of deposits on its inner surface, the deposits may be removed by simply applying the handle 75f and rotating the shaft 75b to move the wiper blade 75d across the window.

The hollow post 58 (Fig. 4) is provided on its upper end with a window 75 and frame 76 so that it also may serve as a sight tube. A prism 74a (Fig. 4) may be placed on the top of the center sight tube, in order to permit a view through it while the head is moving. The post 58 is also provided with a gas inlet 82 near its upper end so that a scavenging flow of cooled inert gas may be directed through it.

Quick-opening doors (Figs. 2B and 6)

The shell 1 is provided with a pair of diametrically opposed quick-opening door mechanisms, generally indicated by the reference numeral 83 and shown in detail in Figs. 2B and 6. These doors are provided for the purpose of inspection and routine repair of the interior of the furnace. A typical routine repair carried on through these doors is the replacement of the electrode tips 50, which must be done periodically.

Referring to Fig. 6, it may be seen that the door mechanism includes a section of seamless pipe 84 which extends through the wall of the shell 1 and has welded to its outer end a peripheral flange 85 which serves as a frame for the door. The flange 85 has a plane surface on its outer side. The door mechanism includes a closure member 86 having on its inner face a plane surface adapted to engage the flange 85 tightly. The closure member 86 has a reinforcing ridge structure 87 welded to its inner face and on its outer face supports four peripherally spaced pins 88. A support member or spider 89 for the closure member 86 is provided with a hinge connection 90 with the pipe section 84. The support member 89 is cross-shaped, as may be seen in Fig. 2B, and is provided with apertures 89a to receive the pins 88.

A screw 91 is threadedly engaged in the central portion of the support member 89 and carries on its inner end a thrust washer 92 which is held in rotatable engagement with the closure member 86 by means of a retainer 93. The outer end of screw 91 is provided with a hand wheel 94. The side of the support member 89 opposite the hinge 90 carries a pair of pivoted latch members 95, biased to latching positions by suitable springs 96.

When the parts are in the positions shown in Fig. 6, the quick-opening door is closed. If the hand wheel 94 is now rotated in a direction to move the closure member 86 outwardly, then as it moves outwardly it becomes possible to rotate the door assembly slightly counterclockwise about the hinge 90, thereby allowing the latches to be swung manually, free of the flange 85. When the latch members 95 have once been freed of their engagement with the flange 85, then the door may be swung completely open in a clockwise direction.

Miscellaneous details of shell (Fig. 4)

The side walls of the shell 1 are double, including an outer wall 1a and an inner wall 1b. These two walls with the end plates 65 define a water jacket 96, provided with a water inlet 97 and a water outlet 98.

Inside the shell 1 and above the bottom end plate 2, there is mounted a generally conical plate 99 which forms part of a water jacket to cool the bottom of the shell. This water jacket is cooled by forcing water under pressure through an inlet 100 into the annular space between the plate 99 and end plate 2 and thence through an outlet 101 at a diametrically opposite point.

A centering ring 102 is mounted on a suitable fixed pad 103 under the periphery of the opening 2a in the end plate 2. As shown in Fig. 4, the inner face of the centering ring 102 is tapered so as to guide the upper end of the crucible 4 when it is inserted in the bottom of the shell 1.

The crucible (Figs. 1, 2C, 5 and 12 to 14)

The crucible comprises a generally cylindrical crucible shell including an outer shell 4a of steel and a copper liner 4b. Alternatively, the liner 4b might be constructed of molybdenum, in which case the liner would have a higher operating temperature, and consequently a larger body of molten metal within the furnace would be possible. The shell 4a and liner 4b are concentric and are spaced apart at their top and bottom ends by suitable spacers so as to define a water jacket 4c between them. The water jacket 4c is provided with a number of peripherally spaced water inlets 104, best seen in Figs. 2C and 13. It should be noticed that the inlets 104 consist of short pipe sections set at an angle to radial lines drawn from the center of the crucible. The effect of this angular setting of the inlet 104 is to direct the water around the crucible shell in a more-or-less helical path. The water is better distributed by arranging the inlets in this manner, so that the cooling of the shell is more uniform and hot spots do not develop. Near the upper end of the shell, it is provided with a number of water outlets 105, best seen in Fig. 14, one outlet being shown in detail in cross-section in Fig. 2B. In Fig. 14 it may be seen that each outlet is surrounded by a U-shaped shield 106, open at the top. The shields 106 prevent any water from entering the outlets except through the upper ends of the shield, consequently all the water must flow close to the upper limit of the water jacket before it can pass a shield 106 and enter an outlet. In this manner the cooling of the complete crucible shell all the way to the upper end is ensured.

On the outside of the crucible shell 4 near its upper end there is provided a built-up conduit 107 to receive the water flowing through the outlets 105. The conduit 107 is provided with a suitable drain connection 108 (Fig. 2B).

The upper side of the built-up conduit 107 is formed by a flange 109 whose upper face is adapted to engage the lower face of the centering ring 102 so as to establish the position of the upper end of the crucible 4 during operation of the furnace. Above the flange 109, there are welded on the outer surface of the shell 4a a number of ribs 110, best seen in Figs. 2B and 5. These ribs fit loosely within the opening 2a in the plate 2 and center the crucible 4 in accurate alignment with the shell 1.

The various parts which make up the crucible shell assembly are preferably welded together, as shown in the drawings.

The lower end of the crucible shell 4 rests on and is attached to a base plate assembly 111 (Fig. 2C), including an upper plate 112 and a lower plate 113. The lower end of the crucible shell 4 is provided with a peripheral flange 114 which, during operation of the furnace, is bolted to the lower base plate 113 by means of bolts 115. The upper and lower base plates define between them a water jacket space 116. Three inlets 117 are provided through the lower base plate 113, angularly spaced as shown in Fig. 12. Each inlet 117 is provided with an elbow nozzle 118 directed at an angle to the radial lines from the center of the crucible so that the water flows tangentially and outwardly from the nozzles 118 and circulates around the water jacket space 116 with a swirling motion. A central water outlet opening 119 is provided. The effect of the inlets 118 and outlet 119 is to distribute the flow smoothly through the water jacket 116 so as to maintain an even temperature in all parts thereof.

It should be noted that, when the crucible is assembled, as shown in Fig. 2C, the upper surface of the upper base plate 112 is in a horizontal plane above the lower end of the water jacket 4c in the crucible shell. The water jacket 4c is thereby effective to cool the entire length of the ingot and the welded joints at the base of the crucible shell are protected from the heat of the ingot.

The upper base plate 112 is provided on its under surface with four ribs 112a (Figs. 2C and 12), which aid in supporting the central portion of plate 112 and the ingot resting on it. These ribs 112a have their edges streamlined, as shown in Fig. 12, to avoid creation of turbulence in the cooling water swirling toward the center outlet 119.

The crucible shell 4 is provided with upper and lower machining bands 120, to provide locating surfaces for machining operations during manufacture or repair of the crucible.

The upper and lower base plates 112 and 113 are both formed of copper. The lower base plate 113 is provided with an annular groove 113a, to receive an O-ring which effectively seals the base plate assembly against leakage of water when the two plates 112 and 113 are together.

Crucible support structure (Figs. 2C, 15 and 19)

When the furnace is in operation the crucible and more specifically the base plate assembly rests on a supporting frame 121, consisting of an upper copper plate 122a brazed to a lower steel plate 122b and separated by a disk insulator 123 and a ring insulator 124 from an outer steel frame member 125. The inner copper annulus 122a is provided with a number of projecting copper conductor bars 126 (see Fig. 15), on which are mounted suitable connectors 127 for the attachment of heavy electric cables.

If the electrodes 22 are insulated from the frame 9, as shown, then it is not necessary to insulate the crucible 4 from the stationary parts by means of the insulators 124 and 125. If the insulators 124 and 125 are not used, then the crucible is operated at ground potential and the electrodes 22 at some negative potential. If it is desired to operate the crucible at some potential other than ground, then the insulators 124 and 125 must be used together with an insulating arrangement at the top of the crucible, as shown in Fig. 19.

Fig. 19 shows an insulator ring 109a and an insulator sleeve 110a which electrically separate the crucible 4 from the shell 1.

The frame 121 is supported on four jacks 128 (Fig. 2C). Each jack 128 may be of any suitable commercial construction, and includes an upwardly projecting threaded shaft 129. On the upper end of the shaft 129 is threaded an adapter 130. A spring 131 is retained in compression between the frame 121 and a shoulder on the adapter. The springs 131 support the entire weight of crucible 4. They permit small lateral movements of the crucible necessary to align it with the opening 2a. They also ensure an equalized sealing pressure throughout the periphery of flange 109. They also permit control of that sealing pressure by operation of the jacks until a desired spring compression is obtained. The spring and adapter are covered by a cylindrical shield 132 welded on the frame 121 and by a telescoping shield 133 keyed to shield 132 and supported by a handle 134 which extends through the shaft 129. The shield 133 is effective to lock handle 134 against rotation. The handle 134 is provided for making minor adjustments of the height of the four jacks, for leveling purposes.

The four jacks 128 are mounted on the truck 5. The two jacks 128 on each side of the truck are driven by a shaft 135. The two shafts 135 on the opposite sides of the truck are connected by a chain drive 137 so that they run concurrently. Two motors 136 may be provided for the two shafts 135 on the opposite sides of the truck. If desired, a single motor may be used to drive the shafts 135.

The truck 5 also supports a motor 138 connected through a suitable driving mechanism including a chain 140, to one axle of the truck 5. The motor 138 when energized drives the truck 5 along the rails 6.

Inert gas supply system (Figs. 16 and 17)

Figs. 16 and 17 illustrate, somewhat diagrammatically, a system for circulating an inert gas, for example helium, argon, or a mixture of the two, through the furnace shell 1 and thereby through the crucible 4 during operation of the furnace.

It has been found that titanium which has been reduced from titanium tetrachloride by use of magnesium contains magnesium and magnesium chloride as impurities. When operating a furnace of the type described to form an ingot of titanium, these impurities vaporize at the high temperatures used for melting the titanium. If not removed from the furnace, these vapors adversely affect the stability of the arcs, and also tend to condense on the cooler parts, thereby fouling those parts and obscuring the sight tubes.

In accordance with the present invention, apparatus is provided for circulating inert gas through the furnace during its operation. In any operation involving titanium or zirconium, the gas must be one of the truly inert gases which cannot combine chemically with the titanium under any circumstances. Titanium, especially at high temperatures in the neighborhood of its melting point, is very active chemically and, with few exceptions, will combine with any element with which it is associated. Since helium and the other inert gases are quite expensive, it is desirable to recirculate the gas.

In the foregoing description of the furnace shell and its associated apparatus, there have been mentioned a number of gas inlets, including the gas inlet 61 (see Fig. 4) which supplies cooled gas to the heat shield around the hopper 59. Gas inlets 81 have been mentioned in connection with the peripheral sight tubes and the gas inlet 82 in connection with the center sight tube. The heat shield tube 53 around the feed pipe 52 is also provided with a gas inlet 63 (Fig. 5).

All these gas inlets are shown in Figs. 16 and 17. There are also shown in Fig. 17 two gas outlets 142 from the furnace shell 1. A dual gas circulating system is shown, the apparatus being duplicated for each outlet. Gas leaving either outlet 142 passes through a valve 143 and thence through a condenser generally indicated at 144, a pump 145 driven by motor 146 and thence through a discharge conduit 147 provided with branch conduits leading to the various gas inlets associated with the furnace shell 12. Each half of the dual system serves one group of gas inlets to the shell 1, and one of the two outlets 142. It will be readily appreciated that a single system of sufficient capacity could be used in place of the dual system shown. The dual system was selected for the installation shown for reasons of convenience and economy and with regard to the space available.

Each condenser 144 has a water inlet 148 and a water outlet 149. The condenser cooling coils are removable from the gas circulating system during periods of shutdown, in order to clean the deposits of magnesium and magnesium chloride from the cooling coils.

The inert gas circulating system serves to remove impurities such as magnesium and magnesium chloride and prevent their inclusion in the finished ingot. Furthermore, when the gas circulating system is completely sealed and operated at a pressure greater than atmospheric, the inert gas prevents oxygen, nitrogen and other chemically active constituents of the atmosphere from coming in contact with the molten titanium, which might otherwise become contaminated with such constituents.

Stirring coil (Fig 1)

During operation of the furnace there is wound about the crucible 4 a coil 150 of a heavy electrical conductor. A direct current is passed through this coil during operation of the furnace. The function of this current is to induce a magnetic field extending vertically through the crucible 4. This vertical magnetic field aids in stabilizing the arcs at the electrode tips 50 and also produces a stirring action in those parts of the charge which are molten. Without the magnetic field produced by coil 150, the fields of the arcs at the electrode tips 50 would tend to draw those arcs toward each other.

The magnetic field of the coil 150 tends to flow principally through the steel shell 4a. In order to get a substantial magnetic field through the crucible, it is necessary to pass sufficient current through coil 150 to saturate the shell, so that the additional magnetic flux not accommodated by the shell passes vertically through the crucible.

From the standpoint of this magnetic field, it would be better if the shell 4a were non-magnetic. However, from considerations of strength and ease of manufacture, it is presently preferred to use a magnetic steel shell, even though a higher current in coil 150 is required because of it. Alternatively, the outer shell might, for example, be made of non-magnetic stainless steel, such as, for example, American Iron and Steel Institute Type 302.

Operation

The operation of the furnace will be described as it is carried on for the production of a titanium ingot from titanium sponge. While certain features of the operation are of particular utility in connection with the formation of titanium ingots, other features of the novel method and apparatus are of more general utility in connection with other materials.

When starting the formation of an ingot, a layer of titanium scrap or particles is first placed in the bottom of the crucible (Fig. 2C). The crucible 4 is then moved into place under the furnace shell 1, and the gas supply system is started up in a scavenging operation to remove all air from inside the furnace.

The scavenging operation is carried out by opening a valve 223 (Fig. 21) at the top of the hopper 189, and opening a by-pass valve 224 around the pressure regulating valve 214 so that inert gas is continuously fed into the shell and passes through the feed pipe 52 and the feeders such as 186 and out through the exhaust valves 223. The condensers 144 and related circulating apparatus are operated during the purge to ensure complete purging of the system. The furnace and its associated parts are thereby purged of all air. After the purging operation has proceeded for a time, the cover of the feeder 189 is opened and a charge of the material to be melted is fed into the hopper, while the purging continues. The cover is replaced and the purging operation is continued throughout this feeding and for a time thereafter, in order to make sure that all air which may have entered with the material is excluded from the furnace system before the melting operation is started. After the scavenging operation has proceeded for a sufficient time, valve 223 and 224 are closed.

When the scavenging operation is complete, the feeding mechanism is started up to feed titanium sponge into the feed pipe 52, the electrodes 22 are lowered so that they are close to the layer of scrap in the bottom of the furnace and their elevation is then placed under the control of the conventional apparatus which controls the motors 34 (Fig. 1) to maintain a constant arc length. The motors 23 are started to oscillate the electrodes 22 on their own axes and the motor 37 is started to oscillate the head 8 and the cage 9 with the complete electrode assembly through an angle of substantially 90°.

The titanium sponge entering the furnace tends to distribute over the central portion of the crucible. The electrodes 22 move about the periphery of this central portion in arcuate paths, the length of the arcuate path for each electrode being established by the angular travel of the head 8. As the electrodes 22 move along these arcuate paths, they are oscillated about their respective axes. The oscillation of the electrodes on their own axes is preferably not synchronous with the oscillation of the head, so that the electrodes during successive passes along their respective arcuate paths will move over different regions of the surface of the growing mass of titanium metal in the crucible.

Figure 18:
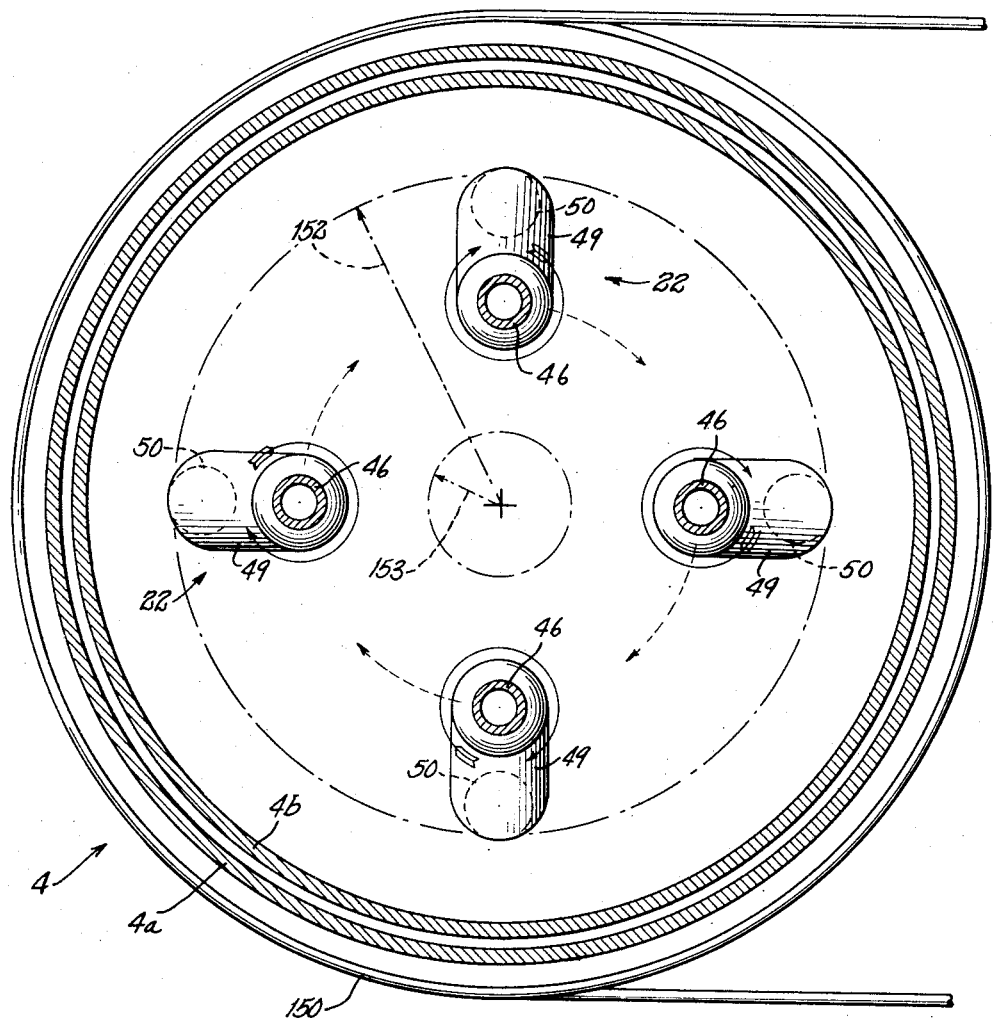
Fig. 18 is a view taken on the line XVIII—XVIII of Fig. 2C, illustrating the paths of movement of the electrodes and the appearance of the inside of the furnace during operation.

The oscillations of the electrodes 22 on their own axes are synchronized with each other and may be controlled as desired, to any angular displacement up to 180°. The electrodes in their oscillations effectively cover an annular zone having an outer radius 152 and an inner radius 153, as shown in Fig. 18. By controlling this amplitude of oscillation of the electrodes on their own axes, the width of this annular zone may be effectively controlled. This oscillation may be controlled so as to vary either the inner radius 153 or the outer radius 152 of the annular zone, as required. The amount of offset on the tip holder 49 may be designed as required to provide coverage of wider or narrower annular zones. As a matter of practice, it has been found desirable to have the electrodes oscillate throughout substantially the complete width of the zone when the process is first started, since the cooling effect of the base water jacket is greater nearer the bottom of the crucible, and the wide range of oscillation is necessary to maintain a substantial zone of liquid. As the process continues and the ingot builds up in the crucible, the zone of operation travels farther away from the crucible base and its water jacket and it is not necessary to oscillate the electrodes through such a wide range. After the ingot is built up to a sufficient depth, typically somewhat less than half the depth of the crucible, the heat losses from the different localities in the crucible become relatively stabilized, so that the oscillation of the electrodes on their own axes may be stopped completely without any adverse effect on the quality of the ingot.

The electric current flowing through the electrodes 22 passes from those electrodes through the molten metal to the crucible shell and base. Since the current density is very high, these currents spread throughout substantially the entire volume of the titanium in the crucible. This current flowing through the titanium develops its own magnetic field, in accordance with well understood laws. The coil 150 induces a vertical magnetic field within the crucible, which reacts with the current flowing in the titanium so as to tend to produce a motion of the titanium. The action is analogous to that of the field current of a motor producing a magnetic field which reacts with the magnetic field of the armature currents to produce a torque tending to move the armature conductors. In the present instance, the winding of the motor and the molten titanium corresponds to the armature conductors.

The continuous motion of the molten titanium until it actually cools to its freezing point is very effective in ensuring a uniform homogeneous structure in the ingot. The stirring action distributes the temperature conditions so that hot and cold spots do not develop. It also ensures that the crystals formed are of relatively fine grain so that large deposits of occluded impurities and other discontinuous structures cannot develop at the grain boundaries.

Under some operating conditions of the furnace, there have been observed pressure fluctuations synchronous with the radial movements of the electrodes. While the exact cause of these fluctuations is not understood, it is considered that they may be due to a more rapid rate of vaporization of impurities as the electrodes move toward the fresher material in the center of the furnace than when the electrodes are moving away from that material. If such conditions are encountered, the pressure fluctuations can be substantially eliminated by operating two of the electrodes in the opposite phase relationship to the other two. In other words, two electrodes are made to travel toward the center of the furnace while the other two are travelling away from the center. This phase relationship may be established by operation of the reversing switch 180, described above in connection with Fig. 11.

While the gravimetric feeders 186 and 187 are described above as being useful in connection with the formation of alloy ingots, they may alternatively be used for the feeding of scrap, fines or other material of the same nature chemically as the principal ingredient of the ingot but having a different particle size.

While the furnace and apparatus described is of particular utility in connection with titanium and zirconium, it may be used to melt other materials. It is particularly useful where the material to be melted has a high melting point, or is highly active chemically, or both.

While I have shown and described a preferred embodiment of my invention, other modifications thereof will readily occur to those skilled in the art, and I therefore intend my invention to be limited only by the appended claims.

I claim:

1. Apparatus for fabricating a metal ingot, comprising a furnace including a crucible for receiving a charge of metal, a plurality of electrodes, means supporting said electrodes within the furnace and projecting downwardly into the crucible and into proximity with the charge therein, means for conducting electric current through the electrodes and the charge to create arcs between the electrodes and the charge and thereby to melt the charge, and means for moving the electrode supporting means about one vertical axis and means for concurrently moving the electrodes along arcuate paths about vertical axes spaced from the said one axis so that said electrodes move over substantial portions of the surface of the charge.

2. Apparatus for fabricating a metal ingot, comprising a furnace including a crucible for receiving a charge of the metal, means for feeding the charge downwardly into the center of the crucible, a plurality of electrodes, means supporting said electrodes within the furnace and projecting downwardly into the crucible and into proximity with the charge therein at points spaced radially from the crucible axis and at substantially equal angles about said axis, means for conducting current through the electrodes and the charge to melt the charge, and means for moving said electrode supporting means angularly about the vertical axis of the crucible.

3. Apparatus for fabricating a metal ingot, comprising a furnace including a crucible for receiving a charge of the metal, means for feeding the charge downwardly into the center of the crucible, a plurality of electrodes, means supporting said electrodes within the furnace and projecting downwardly into the crucible and into proximity with the charge therein at points spaced radially from the crucible axis and at substantially equal angles about said axis, means for conducting current through the electrodes and the charge to melt the charge, means for moving said electrodes synchronously and angularly about axes parallel to the crucible axis and spaced horizontally from their respective points of proximity with the charge, and means for moving said electrode supporting means angularly about the vertical axis of the crucible, so that the electrodes move adjacent an annular portion of the metal surface.

4. Apparatus for fabricating a metal ingot as defined in claim 3, in which said electrode moving means oscillates the electrodes, and including means for controlling the amplitude of oscillation of the electrodes and thereby adjusting the width of said annular portion.

5. Apparatus for fabricating a metal ingot as defined in claim 3, in which: said electrode moving means oscillates the electrodes; said means for moving the supporting means oscillates the supporting means; and said current conducting means includes flexible cables connected to said electrodes above said supporting means.

6. Apparatus for fabricating a metal ingot as defined in claim 3, in which: said electrode moving means oscillates the electrodes; said means for moving the supporting means oscillates the supporting means; said electrodes and said supporting means are hollow; and means including flexible conduit connections for circulating cooling water through said electrodes and said supporting means.

7. Apparatus for fabricating a metal ingot as defined in claim 3, in which said means for moving the supporting means oscillates the supporting means through an angle substantially equal to the angular spacing between electrodes.

8. An electric furnace comprising a generally cylindrical shell having a vertical axis, a head rotatably mounted on the upper end of the shell, at least one electrode extending vertically through said head and projecting downwardly into the furnace, said electrode being spaced from said axis so as to move along an arcuate path as the head turns, means for moving the head angularly on said shell and means for feeding material to be treated in the furnace to a central locality radially within said arcuate path.

9. An electric furnace comprising a generally cylindrical shell having a vertical axis, a head rotatably mounted on the upper end of the shell, at least one electrode extending vertically through said head and projecting downwardly into the furnace, said electrode being spaced from said axis so as to move along an arcuate path as the head turns, means for moving the head angularly on said shell, and means for feeding material to be treated in the furnace to a central locality radially within said arcuate path, said feeding means comprising a hollow center post mounted in said head and projecting downwardly therefrom and open at its lower end, a feed pipe extending through a side of the shell and having its inner end open and spaced from the center post, and a hopper mounted on the center post and having an upper peripheral portion underlying the inner end of the feed pipe, said hopper and post having aligned openings and providing a path for the material from the feed pipe through the hopper and into the center of the hollow post.

10. An electric furnace as defined in claim 9, in which said electrode extends vertically through the hopper, and said hopper includes wall means encircling the electrode and spacing it from the hopper.

11. An electric furnace as defined in claim 9, including a heat shield generally conforming to the outer wall of the hopper and spaced outwardly therefrom to provide an open space between said outer wall and the heat shield.

12. An electric furnace as defined in claim 9, comprising a heat shield tube encircling said feed pipe and open at its inner end.

13. An electric furnace as defined in claim 9, in which said hollow center post extends through said head to the exterior of the furnace, and including a window on the upper end of the post through which the interior of the post may be viewed.

14. An electric furnace comprising a generally cylindrical shell having a vertical axis, a head rotatably mounted on the upper end of the shell, at least one electrode extending vertically through said head and projecting downwardly into the furnace, said electrode being spaced from said axis so as to move along an arcuate path as the head turns, and means for oscillating the head angularly on the end of the shell.

15. An electric furnace as defined in claim 14, comprising a plurality of electrodes spaced from said axis along a corresponding plurality of radial lines.

16. An electric furnace comprising a generally cylindrical shell having a vertical axis, a head rotatably mounted on the upper end of the shell, at least one electrode extending vertically through said head and projecting downwardly into the furnace, said electrode being spaced from said axis so as to move along an arcuate path as the head turns, means for oscillating the head angularly on the end of the shell, said oscillating means comprising a motor mounted on the shell, a gear driven by the motor, variable ratio gear means between the motor and said gear, a sector gear fixed on the head and mating with the motor driven gear, reversing limit switches fixed on the shell and engageable by members moving with the head, and means including said switches controlling the motor to cause oscillation of the head.

17. An electric furnace comprising a generally cylindrical shell having a vertical axis, a head rotatably mounted on the upper end of the shell, at least one electrode extending vertically through said head and projecting downwardly into the furnace, said electrode being spaced from said axis so as to move along an arcuate path as the head turns, means for oscillating the head angularly on the end of the shell, an elongated frame extending upwardly from the head, a carriage movable vertically on the frame and supporting said electrode, a motor for driving the carriage vertically, and means for controlling the carriage driving motor to maintain a constant arc length at the top of the electrode.

18. An electric furnace as defined in claim 17, including bearing means on the carriage supporting the electrode for rotation about its own axis, and a motor supported on the carriage and drivingly connected to the electrode to move it angularly.

19. An electric furnace as defined in claim 17, in which said frame includes a vertical mast having a channel-shaped cross section, tracks on the facing sides of the flanges of said mast, and said carriage has rollers engaging said tracks.

20. An electric furnace as defined in claim 17, including a vertical lead screw rotatably mounted on the frame and connected to the carriage driving motor for rotation thereby, a traveling nut on said lead screw, and means, including spring means, supporting said carriage on said traveling nut.

21. An electric furnace comprising a generally cylindrical shell having a vertical axis, a head, radial and thrust bearing means on the upper end of the shell and rotatably supporting said head, at least one electrode extending vertically through said head and projecting downwardly into the furnace, said electrode being spaced from said axis so as to move along an arcuate path as the head turns, and means for oscillating the head angularly on the end of the shell.

22. An electric furnace as defined in claim 21, including heat shield means within the upper end of the shell and extending between said bearing means and the electrode to protect the bearing means from heat radiating from the electrodes.

23. An electric furnace comprising a generally cylindrical shell having a vertical axis, a head, radial and thrust bearing means on the upper end of the shell and rotatably supporting said head, at least one electrode extending vertically through said head and projecting downwardly into the furnace, said electrode being spaced from said axis so as to move along an arcuate path as the head turns, means for oscillating the head angularly on the end of the shell, an elongated frame extending upwardly from the head, a carriage movable vertically on the frame and supporting said electrode, stationary support means for the furnace including a support extending upwardly to the end of the frame, a radial bearing on said support, and a member fixed on the upper end of the frame and rotatably received in said radial bearing.

24. An electric furnace comprising a generally cylindrical shell having a vertical axis, a head rotatably mounted on the upper end of the shell, water jacket means in said head, flexible conduit means for supplying water to said water jacket means, at least one electrode extending vertically through said head and projecting downwardly into the furnace, said electrode being spaced from said axis so as to move along an arcuate path as the head turns, and means for oscillating the head angularly on the end of the shell.

25. The method of forming a metal ingot from metal particles, comprising the steps of feeding the particles continuously into the central portion of a confined space while moving at least one electric arc continuously about the periphery of said central portion.

26. The method of forming a metal ingot from metal particles, comprising the steps of: feeding a charge of particles continuously into the central portion of a confined space while moving at least one electric arc continuously about the periphery of the central portion, said arc being effective to melt the charge, and oscillating said arc radially with respect to the center of said space so that the arc moves adjacent to an annular region of the charge having a substantial radial dimension.

27. The method of forming a metal ingot from metal particles, comprising the steps of: feeding a charge of particles continuously into the central portion of a confined space while moving at least one electric arc continuously about the periphery of the central portion, said arc being effective to melt the charge, oscillating said arc radially with respect to the center of said space and asynchronously with respect to the arcuate movement so that the arc moves adjacent to an annular region of the charge having a substantial radial dimension, cooling the peripheral parts and the bottom of the space, moving the arc vertically to maintain a constant arc length as the ingot builds up in said space, stopping the radial oscillation of the arc after it reaches a level above the bottom of the space, and thereafter continuing to form the ingot by feeding the particles and moving the arc only peripherally.

28. An electric furnace comprising a generally cylindrical shell having a vertical axis, a head rotatably mounted on the upper end of said shell, a plurality of electrodes extending vertically through said head and projecting downwardly into the furnace, said electrodes being spaced from said axis so as to move along arcuate paths as the head turns, means for oscillating the head angularly on the end of the shell, and means for moving the electrodes radially alternately toward and away from said axis, and concurrently with the oscillation of the head, said radially moving means including means for introducing a phase displacement between the radial movements of at least one electrode and the radial movements of at least one other electrode.

29. Apparatus for fabricating a metal ingot, comprising a furnace including a crucible for receiving a charge of the metal, means for feeding the charge downwardly into the crucible, at least one electrode, means supporting the electrode within the furnace and projecting downwardly into the crucible and into proximity with the charge therein at a point spaced radially from the crucible axis, means for moving said electrode about an axis parallel to the crucible axis and spaced from said point, and means for conducting current through the electrode and the charge to melt the charge.

30. A method of forming a metal ingot, comprising the steps of feeding a charge of the metal continuously into the central portion of a confined space while moving at least one electric arc continuously about the periphery of said central portion.

31. The method of forming a metal ingot comprising the steps of feeding a charge of the metal continuously into the central portion of a confined space while moving at least one electric arc continuously about the periphery of the central portion, said arc being effective to melt the charge, and oscillating said arc radially with respect to the center of the space so that the arc moves adjacent to an annular region of the charge having a substantial radial dimension.

32. An electric furnace comprising a crucible, a plurality of electrodes, means supporting the electrodes with their tips projecting downwardly within said crucible, means for supplying to said crucible electrically conductive material to be melted, means for conducting unidirectional electric current through said electrodes, arcs at said electrodes and said material, said arcs being effective to melt said material, a coil encircling said crucible, and means for conducting unidirectional electric current through said coil to produce a unidirectional magnetic field extending vertically through said crucible, said field reacting with the magnetic fields of the arcs to stabilize the arcs and with the magnetic fields of the currents flowing through the molten metal to stir the molten metal continuously in one direction.

33. An electric furnace as defined in claim 32, in which said crucible is of non-magnetic material.

References Cited in the file of this patent

UNITED STATES PATENTS

| | | |
|---|---|---|
| 575,829 | Joyce et al. | Jan. 26, 1897 |
| 921,325 | Wilson | May 11, 1909 |
| 960,862 | Evans | June 7, 1910 |
| 1,100,994 | Snyder | June 23, 1914 |
| 1,253,766 | Alden | Jan. 15, 1918 |
| 1,296,896 | Wright | Mar. 11, 1919 |
| 1,552,143 | Gray | Sept. 1, 1925 |
| 1,769,979 | Whittam | July 8, 1930 |
| 1,955,726 | Archer | Apr. 24, 1934 |
| 1,973,171 | Jacobi | Sept. 11, 1934 |
| 2,044,555 | Woodruff | June 16, 1936 |
| 2,125,021 | Haynes | July 26, 1938 |
| 2,191,479 | Hopkins | Feb. 27, 1940 |
| 2,202,362 | Weisgerber | May 28, 1940 |
| 2,362,718 | Pidgeon | Nov. 14, 1944 |
| 2,516,190 | Dougherty et al. | July 25, 1950 |
| 2,541,764 | Herres et al. | Feb. 13, 1951 |
| 2,605,724 | Baier | Aug. 5, 1952 |
| 2,640,860 | Herres | June 2, 1953 |
| 2,651,668 | Southern | Sept. 8, 1953 |
| 2,686,822 | Evans et al. | Aug. 17, 1954 |
| 2,686,824 | Evans et al. | Aug. 17, 1954 |

FOREIGN PATENTS

| | | |
|---|---|---|
| 803,861 | France | July 20, 1936 |

OTHER REFERENCES

"Iron Age," Feb. 24, 1944, page 65, col. 1, 1st full paragraph.